United States Patent
Wu et al.

(10) Patent No.: US 12,004,232 B2
(45) Date of Patent: Jun. 4, 2024

(54) RANDOM ACCESS METHOD, APPARATUS, AND SYSTEM

(71) Applicant: HUAWEI TECHNOLOGIES CO., LTD., Guangdong (CN)

(72) Inventors: Yiqun Wu, Shanghai (CN); Yan Chen, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 463 days.

(21) Appl. No.: 17/401,514

(22) Filed: Aug. 13, 2021

(65) Prior Publication Data
US 2021/0378030 A1  Dec. 2, 2021

Related U.S. Application Data

(63) Continuation of application No. PCT/CN2020/075380, filed on Feb. 14, 2020.

(30) Foreign Application Priority Data

Feb. 15, 2019  (CN) .......................... 201910118204.8

(51) Int. Cl.
  *H04W 74/0833*  (2024.01)
  *H04W 72/0446*  (2023.01)
  *H04W 74/08*  (2024.01)

(52) U.S. Cl.
  CPC ... *H04W 74/0841* (2013.01); *H04W 72/0446* (2013.01); *H04W 74/0866* (2013.01)

(58) Field of Classification Search
  CPC ......... H04W 74/0841; H04W 72/0446; H04W 74/0866; H04W 74/006; H04W 74/0833;
  (Continued)

(56) References Cited

U.S. PATENT DOCUMENTS

2013/0242730 A1  9/2013  Pelletier et al.
2015/0271791 A1  9/2015  Webb et al.
(Continued)

FOREIGN PATENT DOCUMENTS

CN  104581983 A  4/2015
CN  104919885 A  9/2015
(Continued)

OTHER PUBLICATIONS

Extended European Search Report and Written Opinion issued in EP20755941.0, dated Mar. 17, 2022, 9 pages.
(Continued)

*Primary Examiner* — Habte Mered

(57) ABSTRACT

A random access method, an apparatus, and a system are disclosed. A terminal device receives, from a network device, information about a PRACH resource set and information about one or more PUSCH resources associated with each PRACH resource in the PRACH resource set. If a first PUSCH resource associated with a valid first PRACH resource in the PRACH resource set is valid, the terminal device sends a first preamble sequence to the network device on the first PRACH resource, and sends uplink data to the network device on the first PUSCH resource. The network device receives the first preamble sequence from the terminal device on the first PRACH resource, and receives the uplink data from the terminal device on the first PUSCH resource. The first preamble sequence is a preamble sequence set associated with the first PUSCH resource.

19 Claims, 18 Drawing Sheets

(58) Field of Classification Search
CPC ............ H04W 72/23; H04W 72/1268; H04W 74/004; H04L 5/0044; H04L 5/0048
See application file for complete search history.

(56) References Cited

U.S. PATENT DOCUMENTS

| | | | |
|---|---|---|---|
| 2016/0366704 | A1 | 12/2016 | Lee et al. |
| 2018/0220450 | A1 | 8/2018 | Aiba et al. |
| 2019/0208550 | A1* | 7/2019 | Ko .................. H04L 5/0094 |
| 2019/0320467 | A1* | 10/2019 | Freda ................ H04W 74/004 |
| 2020/0245373 | A1* | 7/2020 | Xiong ............... H04W 74/0833 |
| 2020/0413356 | A1* | 12/2020 | Wang ................ H04W 72/046 |
| 2021/0127409 | A1* | 4/2021 | Park ................. H04W 74/0866 |
| 2021/0345422 | A1* | 11/2021 | Chen ................ H04W 72/044 |
| 2021/0360708 | A1* | 11/2021 | Chen ................ H04W 74/0841 |
| 2022/0086915 | A1* | 3/2022 | Canonne-Velasquez ................... H04W 74/0833 |
| 2022/0104267 | A1* | 3/2022 | Gao ................. H04W 72/1268 |

FOREIGN PATENT DOCUMENTS

| | | |
|---|---|---|
| CN | 105979594 A | 9/2016 |
| CN | 108271125 A | 7/2018 |
| CN | 108476490 A | 8/2018 |
| CN | 109075914 A | 12/2018 |
| WO | 2015137632 A1 | 9/2015 |
| WO | 2018064367 A1 | 4/2018 |
| WO | WO-2020056717 A1 * | 3/2020 |

OTHER PUBLICATIONS

3GPP TSG-RAN WG1 94, R1-1809903, Summary of Maintenance for PRACH procedure, Qualcomm Incorporated, Gothenburg, Sweden, Aug. 20-Aug. 24, 2018, total 36 pages.

3GPP TS 38.213 V15.4.0: "3rd Generation Partnership Project;Technical Specification Group Radio Access Network; NR; Physical layer procedures for control (Release 15)", Dec. 2018, total 104 pages.

3GPP TSG-RAN WG2 Meeting # 103bis, R2-1814008, 2-Step RACH Procedure, InterDigital,Chengdu, China, Oct. 8-12, 2018, total 5 pages.

3GPP TSG RAN Meeting #82, RP-182894, New work item: 2-step RACH for NR, ZTE Corporation, Sanechips, Sorrento, Italy, Dec. 10-13, 2018, total 5 pages.

Office Action issued in CN 201910118204.8, dated Sep. 6, 2021, total 6 pages.

Search Report and Written Opinion issued in PCT/CN2020/075380, dated Apr. 30, 2020, total 8 pages.

* cited by examiner

RANDOM ACCESS METHOD, APPARATUS, AND SYSTEM

CROSS-REFERENCE TO RELATED APPLICATIONS

This application is a continuation of International Application No. PCT/CN2020/075380, filed on Feb. 14, 2020, which claims priority to Chinese Patent Application No. 201910118204.8, filed on Feb. 15, 2019. The disclosures of the aforementioned applications are hereby incorporated by reference in their entireties.

TECHNICAL FIELD

This application relates to the communications field, and in particular, to a random access method, an apparatus, and a system.

BACKGROUND

Existing random access (RACH) procedures include two types: a contention-based RACH procedure shown in FIG. 1a and a contention-free RACH procedure shown in FIG. 1B. However, in the two RACH procedures shown in FIG. 1a and FIG. 1B, a terminal device and a network device need to perform signaling exchange for a plurality of times. Consequently, there is a relatively high latency in the two RACH procedures, and the two RACH procedures are not applicable to an application scenario with a requirement for a low latency. To resolve the foregoing problems, 2-step RACH procedures are proposed in the conventional technology. The 2-step RACH procedures include a contention-based 2-step RACH procedure shown in FIG. 2a and a contention-free 2-step RACH procedure shown in FIG. 2b. For the contention-based 2-step RACH procedure, the terminal device sends a message A (MsgA) to the network device. The MsgA includes two parts: a random access preamble sequence (preamble) (which is referred to as a preamble sequence for short below) and uplink data. After receiving the MsgA, the network device sends a message B (MsgB) to the terminal device. The MsgB includes a random access response (RAR) and conflict resolution.

For the 2-step RACH procedures, the network device configures a physical random access channel (PRACH) resource (which is also referred to as a PRACH occasion (RO)) and a physical uplink shared channel (PUSCH) resource for the terminal device. However, not every configured PRACH resource and PUSCH resource are valid. For example, as shown in FIG. 3, in a time division duplex (TDD) scenario, each subframe is used for uplink or downlink transmission. If a PRACH resource preconfigured by the network device actually corresponds to a downlink subframe, an RO corresponding to the downlink subframe is an invalid resource, and the terminal device cannot send a preamble sequence in the subframe.

Based on this, in the conventional technology, when performing the 2-step RACH procedures, the terminal device needs to first determine validity of the PRACH resource and validity of the PUSCH resource, and then send the MsgA based on a determining result. However, currently, when the terminal device determines that the PRACH resource is valid and the PUSCH resource may be invalid, there is no related solution of how to perform random access.

SUMMARY

Embodiments of this application provide a random access method, an apparatus, and a system, to reduce a latency in random access and improve resource utilization.

To achieve the foregoing objectives, the following technical solutions are used in the embodiments of this application.

According to a first aspect, a random access method and a corresponding communications apparatus are provided. In the solution, a terminal device receives, from a network device, information about a PRACH resource set and information about one or more PUSCH resources associated with each PRACH resource in the PRACH resource set. Each PUSCH resource associated with each PRACH resource is associated with one preamble sequence set. If a first PUSCH resource associated with a valid first PRACH resource in the PRACH resource set is valid, the terminal device sends a first preamble sequence to the network device on the first PRACH resource, and sends uplink data to the network device on the first PUSCH resource. The first preamble sequence is a preamble sequence in a preamble sequence set associated with the first PUSCH resource. On the one hand, in this embodiment of this application, the terminal device sends the uplink data to the network device on a valid PUSCH resource, thereby reducing a transmission latency of the uplink data, and improving PUSCH resource utilization. On the other hand, in this embodiment of this application, when PUSCH resources associated with a PRACH resource are all invalid, the terminal device sends a second preamble sequence to the network device on the PRACH resource, and skips sending the uplink data, thereby improving PRACH resource utilization. In conclusion, according to the solution provided in this embodiment of this application, a latency in random access can be reduced, and resource utilization can be improved.

In a possible implementation, the terminal device determines whether a first interval between a start time unit in the first PUSCH resource and a first downlink time unit before the start time unit is greater than a first threshold. The first PUSCH resource is a PUSCH resource that is in one or more PUSCH resources associated with the first PRACH resource and that does not include a downlink time unit. If the first interval is greater than the first threshold, the terminal device determines that the first PUSCH resource is valid.

In a possible implementation, the terminal device determines whether a second interval between an end time unit in the first PUSCH resource and a second downlink time unit after the end time unit is greater than a second threshold. The first PUSCH resource is a PUSCH resource that is in one or more PUSCH resources associated with the first PRACH resource and that does not include a downlink time unit. If the second interval is greater than the second threshold, the terminal device determines that the first PUSCH resource is valid.

In a possible implementation, the terminal device determines whether a ratio of a quantity of available uplink time units in the first PUSCH resource to a quantity of time units occupied by the first PUSCH resource is greater than a third threshold. If the ratio is greater than the third threshold, the terminal device determines that the first PUSCH resource is valid. In this embodiment of this application, even if available PUSCH resources are reduced, the terminal device may still use a valid part to complete uplink data transmission, thereby further improving PUSCH resource utilization.

In a possible implementation, the terminal device receives first indication information from the network device, and the first indication information indicates the third threshold.

In a possible implementation, the first PUSCH resource is a resource segment of a second PUSCH resource associated with the first PRACH resource, and the resource segment is used for repeated transmission of a PUSCH. According to the solution, when a part of resource segments in a PUSCH resource including a plurality of resource segments are valid, the part of valid resource segments may still be used for uplink transmission, thereby improving PUSCH resource utilization.

In a possible implementation, if the PUSCH resources associated with the first PRACH resource are all invalid, the terminal device sends a second preamble sequence to the network device on the first PRACH resource, thereby improving PRACH resource utilization.

In a possible implementation, the terminal device receives second indication information from the network device. The second indication information is used to indicate that when there is a valid PRACH resource, and PUSCH resources associated with the valid PRACH resource are all invalid, the terminal device sends a preamble sequence on the valid PRACH resource. In this embodiment of this application, when the PUSCH resources associated with the PRACH resource are all invalid, the terminal device sends the preamble sequence to the network device on the PRACH resource, and skips sending the uplink data.

In a possible implementation, the terminal device receives third indication information from the network device. The third indication information is used to indicate that when there is a valid PRACH resource, and PUSCH resources associated with the valid PRACH resource are all invalid, the terminal device skips sending a preamble sequence on the valid PRACH resource. To be specific, the terminal device continues to determine whether a PRACH resource, other than the valid PRACH resource, in the PRACH resource set is valid.

In a possible implementation, the terminal device receives a RACH configuration message from the network device. The RACH configuration message includes the information about the PRACH resource set and the information about the one or more PUSCH resources associated with each PRACH resource in the PRACH resource set.

According to a second aspect, a random access method and a corresponding communications apparatus are provided. In the solution, a network device sends, to a terminal device, information about a PRACH resource set and information about one or more PUSCH resources associated with each PRACH resource in the PRACH resource set. Each PUSCH resource associated with each PRACH resource is associated with one preamble sequence set. If a first PUSCH resource associated with a valid first PRACH resource in the PRACH resource set is valid, the network device receives a first preamble sequence from the terminal device on the first PRACH resource, and receives uplink data from the terminal device on the first PUSCH resource. The first preamble sequence is a preamble sequence in a preamble sequence set associated with the first PUSCH resource. For a technical effect brought by the second aspect, refer to the technical effect brought by the first aspect.

In a possible implementation, the network device determines whether a first interval between a start time unit in the first PUSCH resource and a first downlink time unit before the start time unit is greater than a first threshold. The first PUSCH resource is a PUSCH resource that is in one or more PUSCH resources associated with the first PRACH resource and that does not include a downlink time unit. If the first interval is greater than the first threshold, the network device determines that the first PUSCH resource is valid.

In a possible implementation, the network device determines whether a second interval between an end time unit in the first PUSCH resource and a second downlink time unit after the end time unit is greater than a second threshold. The first PUSCH resource is a PUSCH resource that is in one or more PUSCH resources associated with the first PRACH resource and that does not include a downlink time unit. If the second interval is greater than the second threshold, the network device determines that the first PUSCH resource is valid.

In a possible implementation, the network device determines whether a ratio of a quantity of available uplink time units in the first PUSCH resource to a quantity of time units occupied by the first PUSCH resource is greater than a third threshold. If the ratio is greater than the third threshold, the network device determines that the first PUSCH resource is valid. In this embodiment of this application, even if available PUSCH resources are reduced, the terminal device may still use a valid part to complete uplink data transmission, thereby further improving PUSCH resource utilization.

In a possible implementation, the network device sends first indication information to the terminal device, and the first indication information indicates the third threshold.

In a possible implementation, the first PUSCH resource is a resource segment of a second PUSCH resource associated with the first PRACH resource, and the resource segment is used for repeated transmission of a PUSCH.

In a possible implementation, if PUSCH resources associated with the first PRACH resource are all invalid, the network device receives a second preamble sequence from the terminal device on the first PRACH resource, thereby improving PRACH resource utilization.

In a possible implementation, the network device sends second indication information to the terminal device. The second indication information is used to indicate that when there is a valid PRACH resource, and PUSCH resources associated with the valid PRACH resource are all invalid, the terminal device sends a preamble sequence on the valid PRACH resource.

In a possible implementation, the network device sends third indication information to the terminal device. The third indication information is used to indicate that when there is a valid PRACH resource, and PUSCH resources associated with the valid PRACH resource are all invalid, the terminal device skips sending a preamble sequence on the valid PRACH resource. To be specific, the network device continues to determine whether a PRACH resource, other than the valid PRACH resource, in the PRACH resource set is valid.

In a possible implementation, the network device sends a RACH configuration message to the terminal device. The RACH configuration message includes the information about the PRACH resource set and the information about the one or more PUSCH resources associated with each PRACH resource in the PRACH resource set.

According to a third aspect, a communications apparatus is provided, to implement the foregoing methods. The communications apparatus may be the terminal device in the first aspect, or an apparatus including the terminal device. Alternatively, the communications apparatus may be the network device in the second aspect, or an apparatus including the network device. The communications apparatus includes a corresponding module, unit, or means for implementing the foregoing method. The module, unit, or means may be implemented by hardware, software, or hardware executing corresponding software. The hardware or the software includes one or more modules or units corresponding to the foregoing functions.

According to a fourth aspect, a communications apparatus is provided. The communications apparatus includes a processor and a memory. The memory is configured to store one or more computer instructions, and when the processor executes the one or more instructions, the communications apparatus is enabled to perform the method according to any one of the foregoing aspects. The communications apparatus may be the terminal device in the first aspect, or an apparatus including the terminal device. Alternatively, the communications apparatus may be the network device in the second aspect, or an apparatus including the network device.

According to a fifth aspect, a communications apparatus is provided. The communications apparatus includes a processor. The processor is configured to: be coupled to a memory, and after reading one or more instructions in the memory, perform the method according to any one of the foregoing aspects based on the one or more instructions. The communications apparatus may be the terminal device in the first aspect, or an apparatus including the terminal device. Alternatively, the communications apparatus may be the network device in the second aspect, or an apparatus including the network device.

According to a sixth aspect, a computer-readable storage medium is provided. The computer-readable storage medium stores one or more instructions, and when the one or more instructions are run on a communications apparatus, a computer is enabled to perform the method according to any one of the foregoing aspects.

According to a seventh aspect, a computer program product including one or more instructions is provided. When the computer program product runs on a communications apparatus, a computer is enabled to perform the method according to any one of the foregoing aspects.

According to an eighth aspect, a communications apparatus (for example, the communications apparatus may be a chip or a chip system) is provided. The communications apparatus includes a processor, configured to implement the function in any one of the foregoing aspects. In a possible implementation, the communications apparatus further includes a memory. The memory is configured to store one or more program instructions and data that are necessary. When the communications apparatus is a chip system, the communications apparatus may include a chip, or may include a chip and another discrete component.

For technical effects brought by any example embodiments in the third aspect to the eighth aspect, refer to the technical effects brought by different example embodiments in the first aspect or the second aspect.

According to a ninth aspect, a communications system is provided. The communications system includes the terminal device in the foregoing aspects and the network device in the foregoing aspects.

DESCRIPTION OF EMBODIMENTS

Figure 1A:
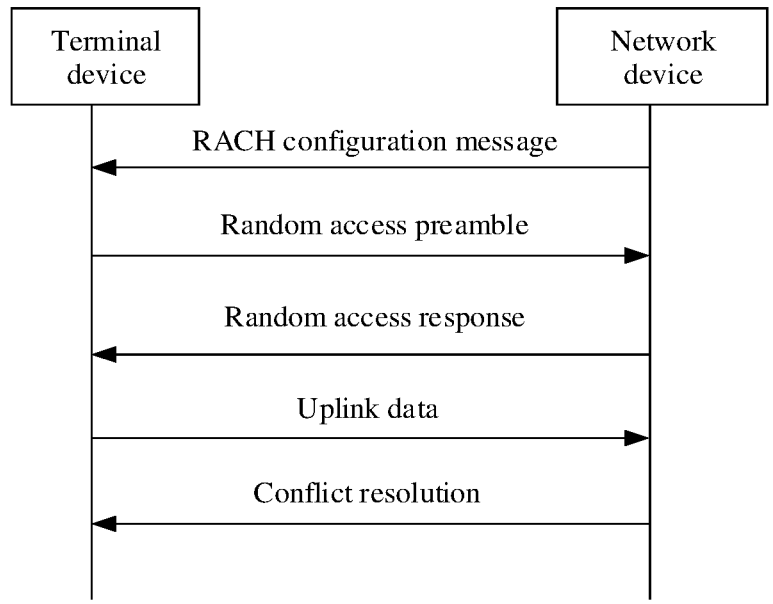
FIG. 1a shows an existing contention-based random access procedure.
Figure 1B:
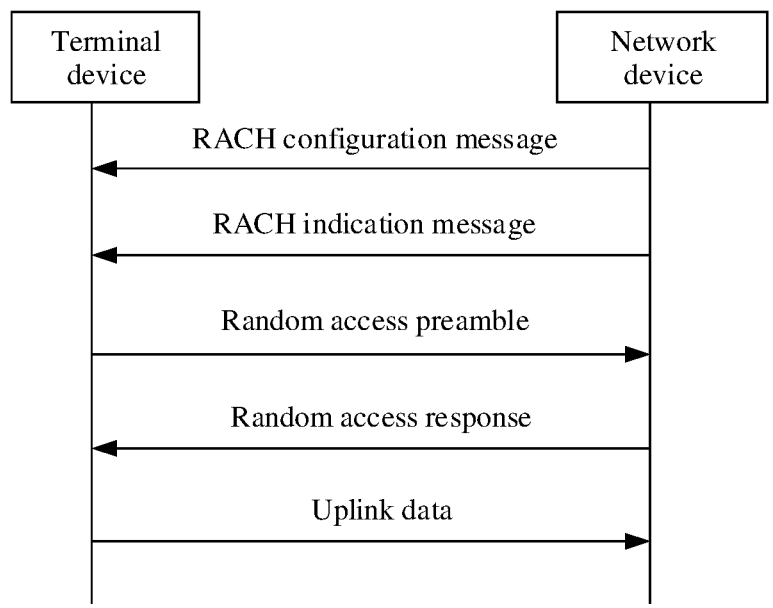
FIG. 1B shows an existing contention-free random access procedure.
Figure 2A:
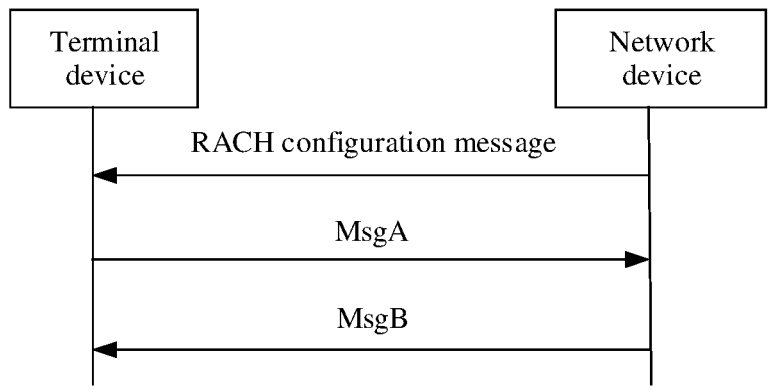
FIG. 2a shows an existing contention-based 2-step random access procedure.
Figure 2B:
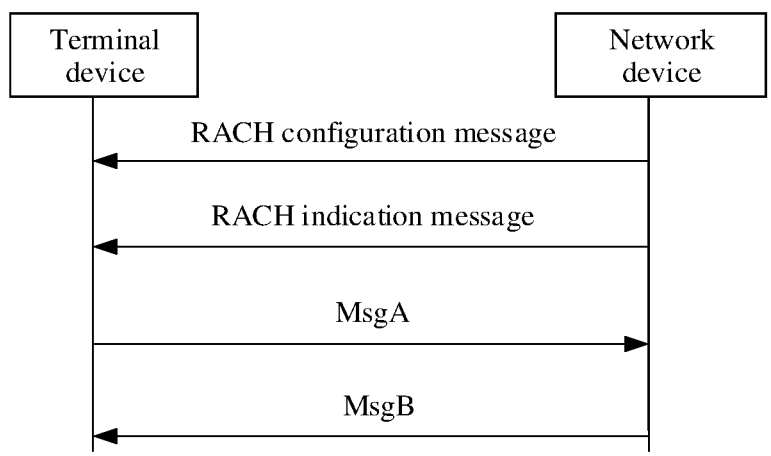
FIG. 2b shows an existing contention-free 2-step random access procedure.
Figure 3:
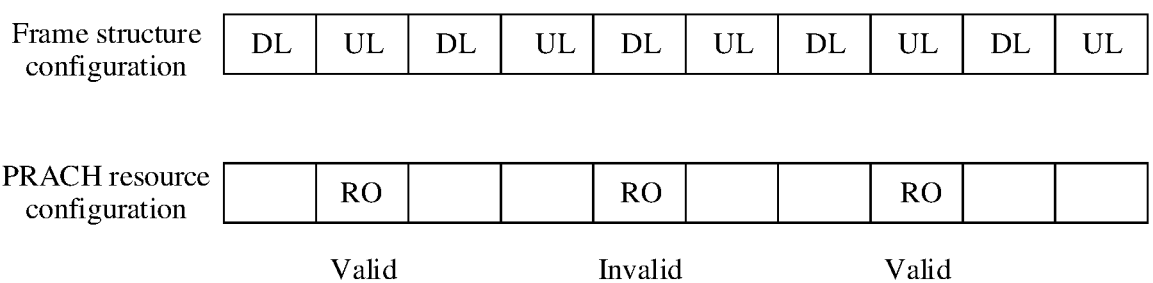
FIG. 3 is a schematic diagram of existing frame structure configuration and PRACH resource configuration.

The following describes the technical solutions in the embodiments of this application with reference to the accompanying drawings in the embodiments of this application. In the description of this application, "/" represents an or relationship between associated objects unless otherwise specified. For example, A/B may represent A or B. The term "and/or" in this application indicates only an association relationship for describing associated objects and indicates that three relationships may exist. For example, A and/or B may indicate the following three cases: Only A exists, both A and B exist, and only B exists, where A and B may be singular or plural. In addition, unless otherwise specified, "a plurality of" in the descriptions of this application means two or more than two. "At least one item (piece) of the following" or a similar expression thereof means any combination of these items, including any combination of singular items (pieces) or plural items (pieces). For example, at least one of a, b, or c may indicate: a, b, c, a and b, a and c, b and c, or a, b, and c, where a, b, and c may be singular or plural. In addition, for convenience of clear description of the technical solutions in the embodiments of this application, in the embodiments of this application, words such as "first", "second", and the like are used to distinguish same objects or similar objects of which functions and purposes are basically the same. A person skilled in the art may understand that the terms such as "first" and "second" do not limit a quantity or an execution sequence, and the terms such as "first" and "second" do not indicate a definite difference.

The technical solutions in the embodiments of this application may be used in various communications systems, such as an orthogonal frequency-division multiple access (OFDMA for short) system, a single-carrier frequency division multiple access (single carrier FDMA, SC-FDMA for short) system, and other systems. The terms "system" and "network" can be interchanged with each other. The OFDMA system may implement wireless technologies such as evolved universal radio terrestrial access (E-UTRA for short) and ultra mobile broadband (UMB for short). The E-UTRA is an evolved version of a universal mobile telecommunications system (UMTS for short). The 3rd generation partnership project (3GPP for short) uses a new version of E-UTRA in long term evolution (LTE for short) and various versions evolved based on LTE. A 5G communications system is a next-generation communications system under research. The 5G communications system includes a 5G non-standalone (NSA for short) mobile communications system, a 5G standalone (SA for short) mobile communications system, or both a 5G NSA mobile communications system and a 5G SA mobile communications system. In addition, the communications systems may further be applicable to a future-oriented communications technology, and are all applicable to the technical solutions provided in the embodiments of this application. The foregoing communications systems applicable to this application are merely examples for description, and communications systems applicable to this application are not limited thereto.

Figure 4:
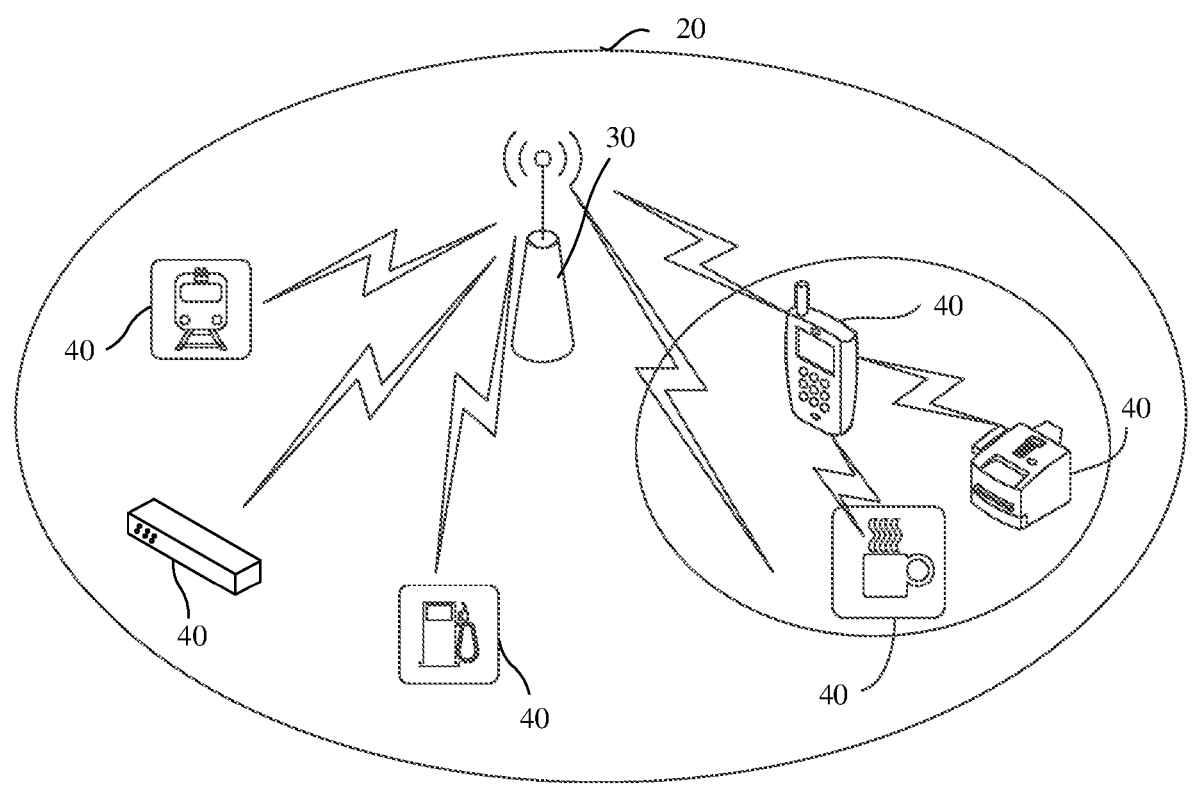
FIG. 4 is a schematic structural diagram of a communications system according to an embodiment of this application.

FIG. 4 shows a communications system 20 according to an embodiment of this application. The communications system 20 includes a network device 30 and one or more terminal devices 40 connected to the network device 30. Optionally, different terminal devices 40 may communicate with each other.

An example in which the network device 30 shown in FIG. 4 interacts with any terminal device 40 is used. In a possible implementation of this embodiment of this application, when a PRACH resource is valid, it is determined whether PUSCH resources associated with the PRACH resource are partially valid. When the PUSCH resources associated with the PRACH resource are partially valid, the terminal device sends a first preamble sequence to the network device on the valid PRACH resource, and sends uplink data to the network device on the valid part of the PUSCH resources. When the PRACH resource is valid, and the PUSCH resources associated with the PRACH resource are all invalid, the terminal device sends a second preamble sequence to the network device on the PRACH resource, and skips sending uplink data. Specific implementations of the solution are to be described in subsequent method embodiments. According to the solution, because the uplink data is sent by using the valid PUSCH resource, a transmission latency of the uplink data is reduced, and PUSCH resource utilization is improved. When all the PUSCH resources associated with the valid PRACH resource are invalid, a preamble sequence is sent on the PRACH resource, thereby improving PRACH resource utilization.

Alternatively, an example in which the network device 30 shown in FIG. 4 interacts with any terminal device 40 is used. In another possible implementation of this embodiment of this application, when a PRACH resource is valid, it is determined whether PUSCH resources associated with the PRACH resource are partially valid. When the PUSCH resources associated with the PRACH resource are partially valid, the terminal device sends a first preamble sequence to the network device on the valid PRACH resource, and sends uplink data to the network device on the valid part of the PUSCH resources. When the PRACH resource is valid, and the PUSCH resources associated with the PRACH resource are all invalid, the terminal device continues to determine whether another PRACH resource is valid. Specific implementations of the solution are to be described in subsequent method embodiments. According to the solution, because the uplink data is sent by using the valid PUSCH resource, a transmission latency of the uplink data is reduced, and PUSCH resource utilization is improved.

Optionally, the network device 30 in this embodiment of this application is a device that connects the terminal device 40 to a wireless network, and may be an evolved NodeB (eNB or eNodeB) in long term evolution (LTE), a base station in a 5th generation (5G) network or a future evolved public land mobile network (PLMN), a broadband network gateway (BNG), an aggregation switch or a non-third generation partnership project (3rd generation partnership project, 3GPP) access device, or the like. This is not specifically limited in embodiments of this application. Optionally, the base station in this embodiment of this application may include base stations in various forms, for example, a macro base station, a micro base station (which is also referred to as a small cell), a relay station, and an access point. This is not specifically limited in embodiments of this application.

Optionally, the terminal device 40 in this embodiment of this application may be a device such as a terminal or a chip that may be used in a terminal, configured to implement a wireless communication function. The terminal may be user equipment (UE), an access terminal, a terminal unit, a terminal station, a mobile station, a mobile console, a remote station, a remote terminal, a mobile device, a wireless communications device, a terminal agent, a terminal apparatus, or the like in the 5G network or the future evolved PLMN. The access terminal may be a cellular phone, a cordless phone, a session initiation protocol (SIP) phone, a wireless local loop (WLL) station, a personal digital assistant (PDA), a handheld device and a computing device having a wireless communication function, another processing device connected to a wireless modem, a vehicle-mounted device, a wearable device, a virtual reality (VR) terminal device, an augmented reality (AR) terminal device, a wireless terminal in industrial control, a wireless terminal in self driving, a wireless terminal in telemedicine (remote medical), a wireless terminal in smart grid, a wireless terminal in transportation safety, a wireless terminal in smart city, a wireless terminal in smart home, or the like. The terminal may be mobile or in a fixed position.

Optionally, the network device 30 and the terminal device 40 in this embodiment of this application may also be referred to as communications apparatuses, and each may be a general-purpose device or a dedicated device. This is not specifically limited in embodiments of this application.

Figure 5:
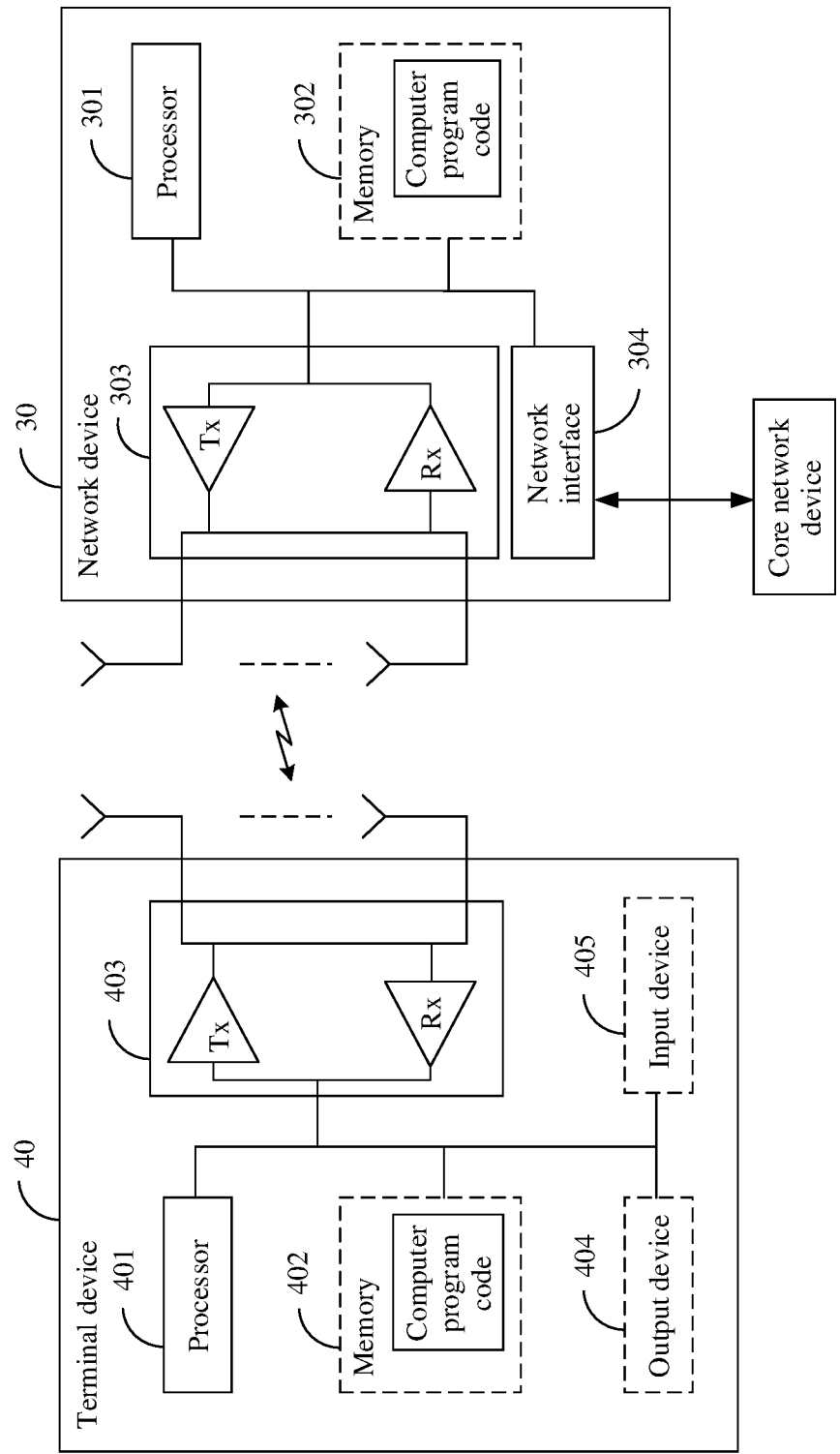
FIG. 5 is a schematic structural diagram of a terminal device and a network device according to an embodiment of this application.

Optionally, FIG. 5 is a schematic structural diagram of a network device 30 and a terminal device 40 according to an embodiment of this application.

The terminal device 40 includes at least one processor (an example in which the terminal device 40 includes one processor 401 is used for description in FIG. 5) and at least one transceiver (an example in which the terminal device 40 includes one transceiver 403 is used for description in FIG. 5). Optionally, the terminal device 40 may further include at least one memory (an example in which the terminal device 40 includes one memory 402 is used for description in FIG. 5), at least one output device (an example in which the terminal device 40 includes one output device 404 is used for description in FIG. 5), and at least one input device (an example in which the terminal device 40 includes one input device 405 is used for description in FIG. 5).

The processor 401, the memory 402, and the transceiver 403 are connected through a communications line. The communications line may include a path transmitting information between the foregoing components.

The processor 401 may be a general-purpose central processing unit (CPU), a microprocessor, an application-specific integrated circuit (ASIC), or one or more integrated circuits configured to control program execution of the solutions in this application. In a specific implementation, in an embodiment, the processor 401 may also include a plurality of CPUs, and the processor 401 may be a single-core (single-CPU) processor or a multi-core (multi-CPU) processor. The processor herein may refer to one or more devices, circuits, and/or processing cores configured to process data (for example, a computer program instruction).

The memory 402 may be an apparatus having a storage function. For example, the memory 402 may be a read-only memory (ROM) or another type of static storage device that can store static information and one or more instructions, or a random access memory (RAM) or another type of dynamic storage device that can store information and one or more instructions. The memory 402 may alternatively be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray disc, and the like), a magnetic disk storage medium or another magnetic storage device, or any other medium that can be used to carry or store expected program code in a form of one or more instructions or a data structure and that is accessible by a computer. However, the memory 402 is not limited thereto. The memory 402 may exist independently and is connected to the processor 401 through the communications line. Alternatively, the memory 402 may be integrated with the processor 401.

The memory 402 is configured to store one or more computer-executable instructions for performing the solutions in this application, and the processor 401 controls execution of the one or more computer-executable instructions. Specifically, the processor 401 is configured to execute the one or more computer-executable instructions stored in the memory 402, to implement the random access method in the embodiments of this application. Optionally, the computer-executable instruction in this embodiment of this application may also be referred to as application program code or computer program code. This is not specifically limited in embodiments of this application.

The transceiver 403 may be any apparatus such as a transceiver, and is configured to communicate with another device or a communications network such as an Ethernet, a radio access network (RAN), or a wireless local area network (WLAN). The transceiver 403 includes a transmitter (Tx) and a receiver (Rx).

The output device 404 communicates with the processor 401, and may display information in a plurality of manners. For example, the output device 404 may be a liquid crystal display (LCD), a light emitting diode (LED) display device, a cathode ray tube (CRT) display device, a projector, or the like.

The input device 405 communicates with the processor 401, and may receive an input of a user in a plurality of manners. For example, the input device 405 may be a mouse, a keyboard, a touchscreen device, a sensing device, or the like.

The network device 30 includes at least one processor (an example in which the network device 30 includes one processor 301 is used for description in FIG. 5), at least one transceiver (an example in which the network device 30 includes one transceiver 303 is used for description in FIG. 5), and at least one network interface (an example in which the network device 30 includes one network interface 304 is used for description in FIG. 5). Optionally, the network device 30 may further include at least one memory (an example in which the network device 30 includes one memory 302 is used for description in FIG. 5). The processor 301, the memory 302, the transceiver 303, and the network interface 304 are connected through a communications line. The network interface 304 is configured to connect to a core network device through a link (for example, an Si interface), or connect to a network interface of another network device through a wired or wireless link (for example, an X2 interface) (not shown in the FIG. 5). This is not specifically limited in embodiments of this application. In addition, for descriptions about the processor 301, the memory 302, and the transceiver 303, refer to descriptions about the processor 401, the memory 402, and the transceiver 403 in the terminal device 40.

Figure 6:
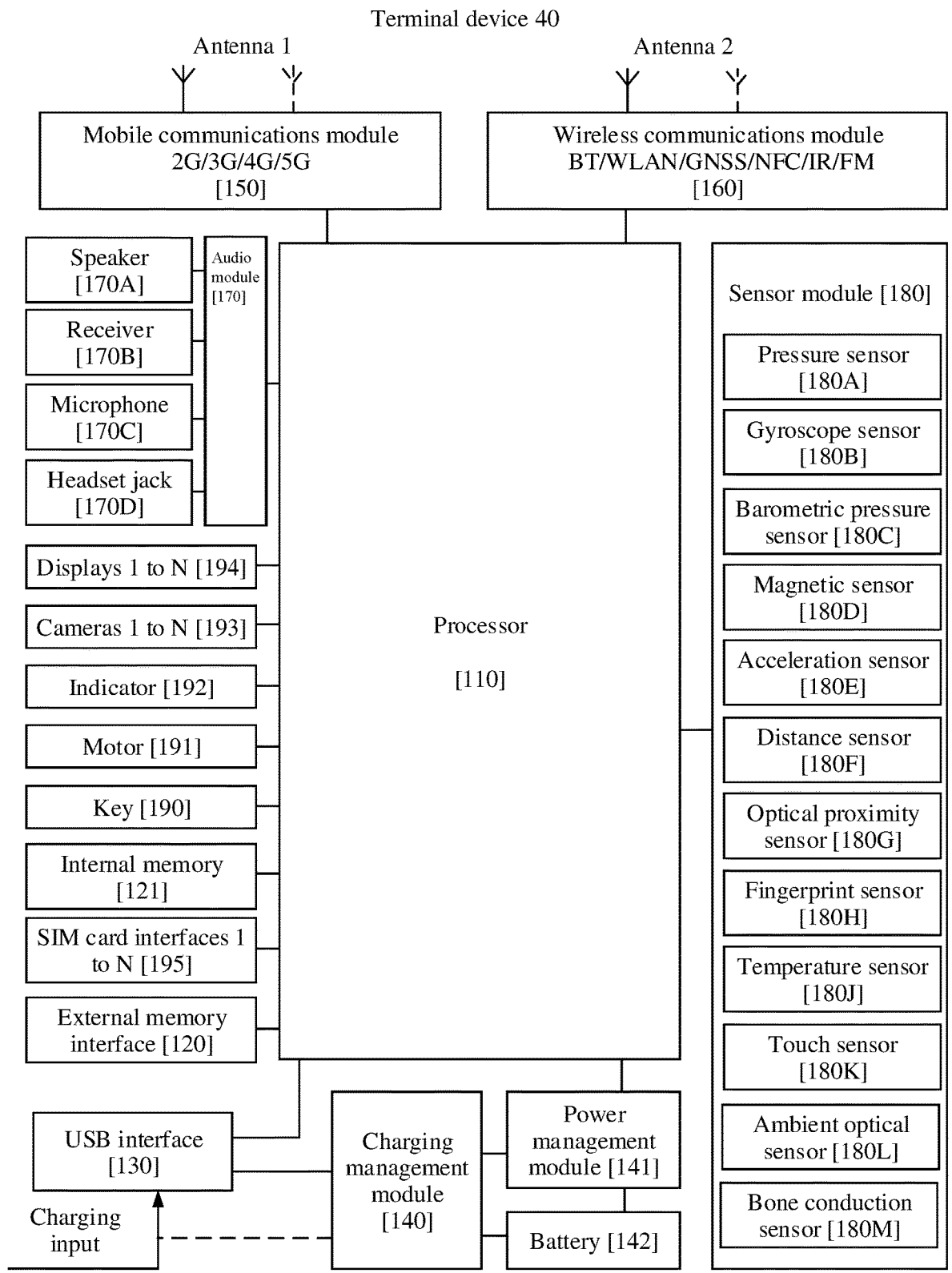
FIG. 6 is another schematic structural diagram of a terminal device according to an embodiment of this application.

With reference to a schematic structural diagram of the terminal device 40 shown in FIG. 5, for example, FIG. 6 is a specific structural form of the terminal device 40 according to an embodiment of this application.

In some embodiments, a function of the processor 401 in FIG. 5 may be implemented by a processor 110 in FIG. 6.

In some embodiments, a function of the transceiver 403 in FIG. 5 may be implemented by using an antenna 1, an antenna 2, a mobile communications module 150, a wireless communications module 160, and the like in FIG. 6.

The antenna 1 and the antenna 2 are configured to transmit and receive an electromagnetic wave signal. Each antenna in the terminal device 40 may be configured to cover one or more communication frequency bands. Different antennas may be further multiplexed to improve antenna utilization.

For example, the antenna 1 may be multiplexed as a diversity antenna of a wireless local area network. In some other embodiments, an antenna may be used in combination with a tuning switch.

The mobile communications module 150 may provide a solution used for wireless communication including 2G, 3G, 4G, 5G, and the like in the terminal device 40. The mobile communications module 150 may include at least one filter, a switch, a power amplifier, a low noise amplifier (LNA), and the like. The mobile communications module 150 may receive an electromagnetic wave by using the antenna 1, perform processing such as filtering and amplification on the received electromagnetic wave, and transmit a processed electromagnetic wave to a modem processor for demodulation. The mobile communications module 150 may further amplify a signal modulated by the modem processor, convert an amplified signal into an electromagnetic wave, and radiate the electromagnetic wave by using the antenna 1. In some embodiments, at least some functional modules of the mobile communications module 150 may be disposed in the processor 110. In some embodiments, at least some functional modules of the mobile communications module 150 and at least some modules of the processor 110 may be disposed in a same device.

The wireless communications module 160 may provide a solution used for wireless communication including a wireless local area network (WLAN) (for example, a Wi-Fi network), Bluetooth (blue tooth, BT), a global navigational satellite system (GNSS), frequency modulation (FM), near field communication (NFC), an infrared (IR) technology, and the like in the terminal device 40. The wireless communications module 160 may be one or more devices that integrate at least one communications processing module. The wireless communications module 160 receives an electromagnetic wave by using the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, convert a processed signal into an electromagnetic wave, and radiate the electromagnetic wave by using the antenna 2. When the terminal device 40 is a first device, that the wireless communications module 160 may provide a solution used for NFC wireless communication on the terminal device 40 means that the first device includes an NFC chip. The NFC chip can improve an NFC wireless communication function. When the terminal device 40 is a second device, that the wireless communications module 160 may provide a solution used for NFC wireless communication on the terminal device 40 means that the first device includes an electronic label (such as a radio frequency identification (RFID) label). An NFC chip, near the electronic label, of another device may perform NFC wireless communication with the second device.

In some embodiments, the antenna 1 of the terminal device 40 is coupled to the mobile communications module 150, and the antenna 2 is coupled to the wireless communications module 160, so that the terminal device 40 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and the like. The GNSS may include a global positioning system (GPS), a global navigation satellite system (GLONASS), a BeiDou navigation satellite system (BDS), a quasi-zenith satellite system (QZSS), and a satellite based augmentation system (SBAS).

In some embodiments, a function of the memory 402 in FIG. 5 may be implemented by using an internal memory 121, an external memory (such as a Micro SD card) connected to an external memory interface 120 in FIG. 6, or the like.

In some embodiments, a function of the output device 404 in FIG. 5 may be implemented by using a display 194 in FIG. 6. The display 194 is configured to display an image, a video, and the like. The display 194 includes a display panel.

In some embodiments, a function of the input device 405 in FIG. 5 may be implemented by using a mouse, a keyboard, a touchscreen device, or a sensor module 180 in FIG. 6. For example, as shown in FIG. 6, the sensor module 180 may include, for example, one or more of a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient optical sensor 180L, and a bone conduction sensor 180M. This is not specifically limited in embodiments of this application.

In some embodiments, as shown in FIG. 6, the terminal device 40 may further include one or more of an audio module 170, a camera 193, an indicator 192, a motor 191, a key 190, a SIM card interface 195, a USB interface 130, a charging management module 140, a power management module 141, and a battery 142. The audio module 170 may be connected to a speaker 170A (which is also referred to as a "horn"), a receiver 170B (which is also referred to as an "earpiece"), a microphone 170C (which is also referred to as a "microphone" or a "microphone"), a headset jack 170D, or the like. This is not specifically limited in embodiments of this application.

It may be understood that the structure shown in FIG. 6 does not constitute a specific limitation on the terminal device 40. For example, in some other embodiments of this application, the terminal device 40 may include more or fewer components than those shown in the figure, or combine some components, or split some components, or have different component arrangements. The components shown in the figure may be implemented by hardware, software, or a combination of software and hardware.

With reference to FIG. 1 to FIG. 6, the following describes in detail the random access method provided in the embodiments of this application by using an example in which the network device 30 interacts with any terminal device 40 in FIG. 4.

It should be noted that in the following embodiments of this application, names of messages between network elements, names of parameters in messages, or the like are merely examples, and there may be other names in a specific implementation. This is not specifically limited in the embodiments of this application.

Figure 7:
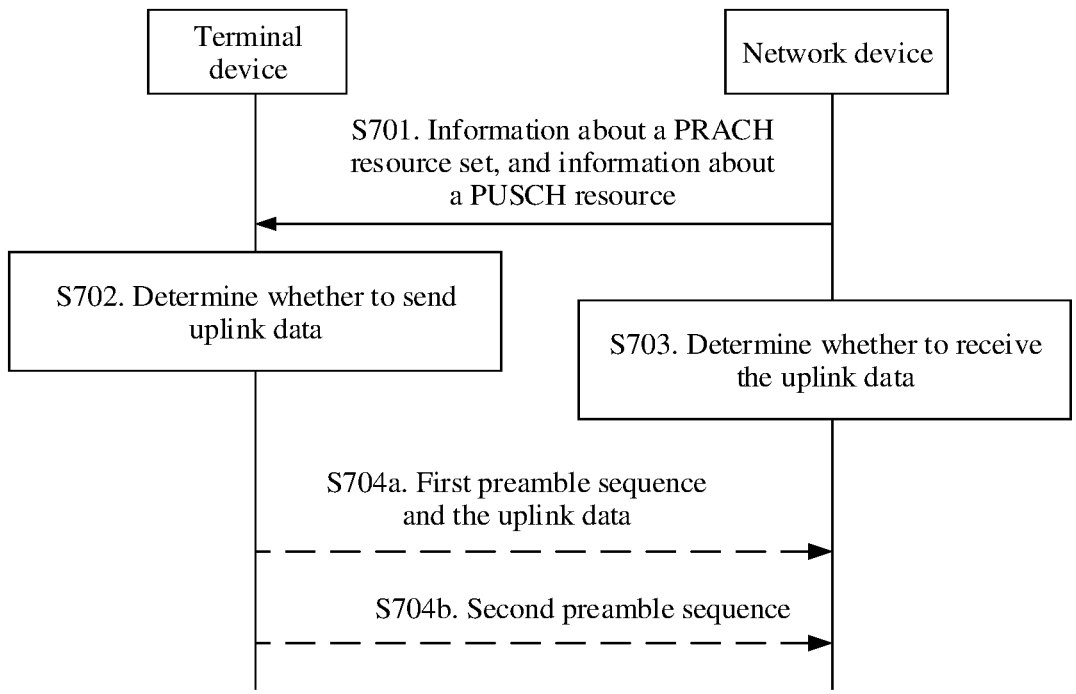
FIG. 7 is a schematic flowchart 1 of a random access method according to an embodiment of this application.

FIG. 7 shows a random access method according to an embodiment of this application. The random access method includes the following steps.

S701. A network device sends, to a terminal device, information about a PRACH resource set and information about one or more PUSCH resources associated with each PRACH resource in the PRACH resource set. Correspondingly, the terminal device receives, from the network device, the information about the PRACH resource set and the information about the one or more PUSCH resources associated with each PRACH resource in the PRACH resource set.

Figure 8:
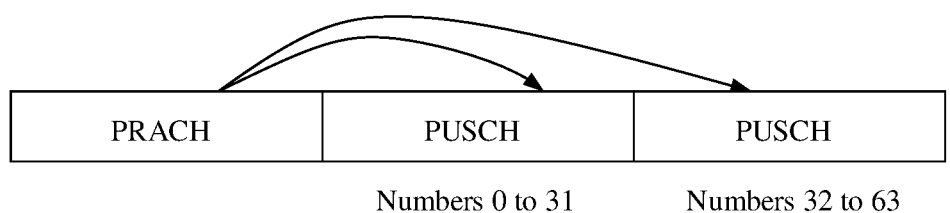
FIG. 8 is a schematic diagram 1 of association between a PUSCH resource and a preamble sequence set according to an embodiment of this application.

In this embodiment of this application, each of one or more PUSCH resources associated with one PRACH resource is associated with one preamble sequence set. For example, as shown in FIG. 8, 64 preamble sequences are defined on one PRACH resource. Preamble sequences numbered 0 to 31 are a first preamble sequence set, and the first preamble sequence set may be associated with one PUSCH resource. Preamble sequences numbered 32 to 63 are a second preamble sequence set, and the second preamble sequence set may be associated with another PUSCH resource. It should be noted that the preamble sequences included in the preamble sequence sets and an association relationship between a PUSCH resource and a preamble sequence set are merely examples of descriptions in this application. In actual application, this is not specifically limited in embodiments of this application.

Optionally, in this embodiment of this application, the information about the PRACH resource set and the information about the one or more PUSCH resources associated with each PRACH resource in the PRACH resource set may be carried in a RACH configuration message to be sent by the network device to the terminal device. The RACH configuration message may be carried in a system message such as a master information block (MIB) or a system message block (SIB). Alternatively, the RACH configuration message may be a user-specific radio resource control (RRC) message. This is not specifically limited in embodiments of this application. Certainly, in this embodiment of this application, the information about the PRACH resource set and the information about the one or more PUSCH resources associated with each PRACH resource in the PRACH resource set that are both sent by the network device to the terminal device may alternatively be carried in different messages. This is not specifically limited in embodiments of this application.

Figure 9:
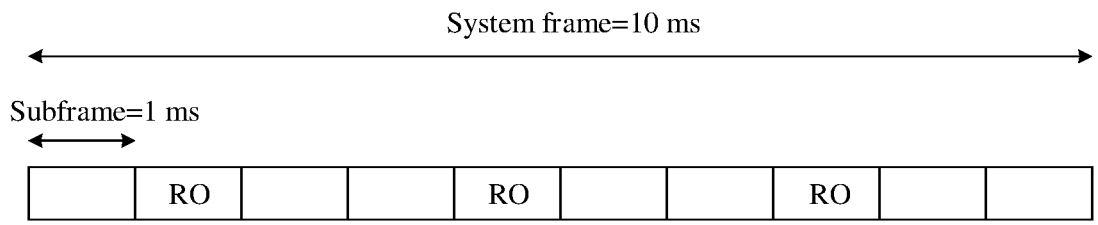
FIG. 9 is a schematic diagram of PRACH resource configuration according to an embodiment of this application.

Optionally, in this embodiment of this application, the network device may periodically configure the PRACH resource set for the terminal device in time domain. For example, as shown in FIG. 9, a new radio access technology (new RAT, NR) system is used as an example. In the NR system, each system frame includes 10 subframes that each have a length of 1 ms and that are numbered 0 to 9. The network device may configure the subframes numbered 1, 4, and 7 in each system frame as PRACH time domain resources. In frequency domain, for example, the network device may configure physical resource blocks (PRB) numbered 10 to 15 as PRACH frequency domain resources. Certainly, the network device may alternatively configure subframes with other numbers in the system frame as PRACH time domain resources, and configure PRBs with other numbers as PRACH frequency domain resources. This is not specifically limited in embodiments of this application. Therefore, each PRACH resource includes one time-frequency resource, and each PRACH resource may include a maximum of 64 available preamble sequences. Each preamble sequence corresponds to cyclic shifts of different sequences or a cyclic shift of a same sequence. The preamble sequence may be a Zadoff-Chu (ZC for short) sequence or another sequence. This is not specifically limited in embodiments of this application. Optionally, the network device may send a physical downlink control channel (PDCCH) instruction to the terminal device, to indicate, to the terminal device, the PRACH resource set configured by the network device for the terminal device.

Figure 10:
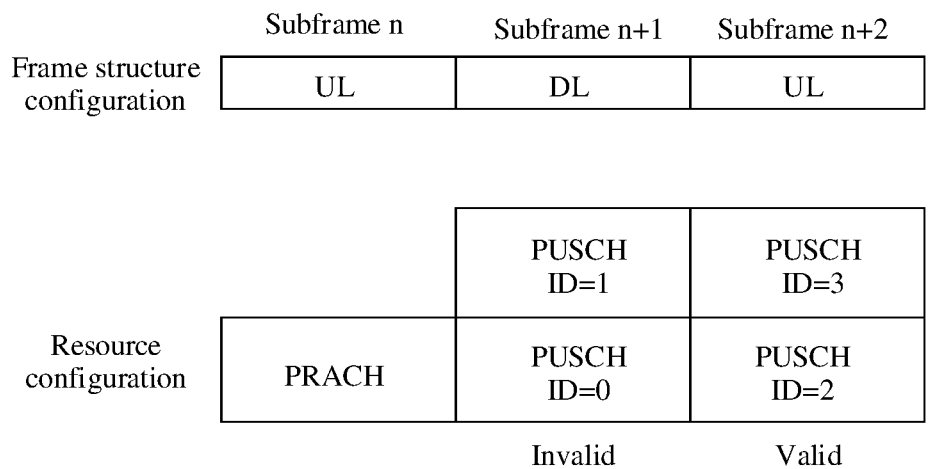
FIG. 10 is a schematic diagram of PUSCH resource configuration according to an embodiment of this application.
Figure 11:
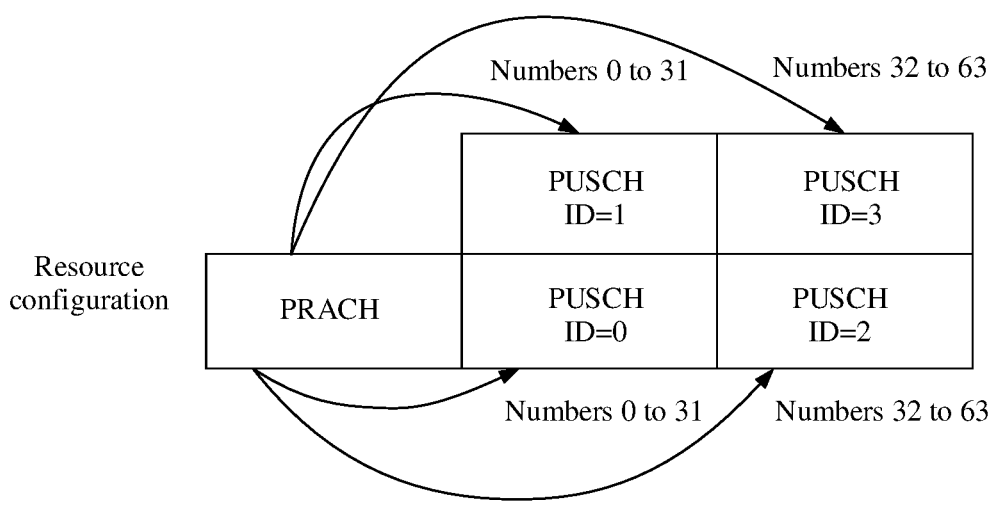
FIG. 11 is a schematic diagram 2 of association between a PUSCH resource and a preamble sequence set according to an embodiment of this application.

Optionally, in this embodiment of this application, when configuring one or more PUSCH resources associated with a PRACH resource, the network device may configure a plurality of PUSCH resources for one PRACH resource. In the plurality of PUSCH resources, a part of the PUSCH resources may be valid and a part of the PUSCH resources may be invalid, or all the PUSCH resources are valid, or all the PUSCH resources are invalid. The plurality of PUSCH resources associated with one PRACH may be numbered first in frequency domain and then in time domain. The PUSCH resources are numbered in ascending order of PRB numbers in frequency domain, and are numbered based on an orthogonal frequency division multiplexing (OFDM) symbol or a slot in time domain Certainly, the PUSCH resources may alternatively be numbered in another manner. This is not specifically limited in embodiments of this application. For example, as shown in FIG. 10, the network device configures four PUSCH resources for one PRACH resource, and the four PUSCH resources are numbered first in frequency domain and then in time domain. When one PRACH resource is associated with a plurality of PUSCH resources, preamble sequence sets associated with the PUSCH resources may be the same or may be different. For example, as shown in FIG. 11, one PRACH resource is associated with four PUSCH resources. PUSCH resources numbered 0 and 1 may be associated with the first preamble sequence set, and PUSCH resources numbered 2 and 3 may be associated with the second preamble sequence set.

Figure 12A:
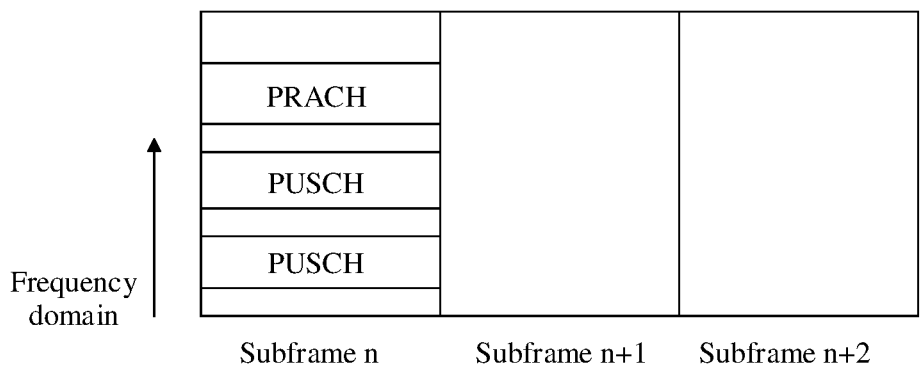
FIG. 12a is a schematic diagram of time division multiplexing of a PRACH resource and a PUSCH resource according to an embodiment of this application.
Figure 12B:
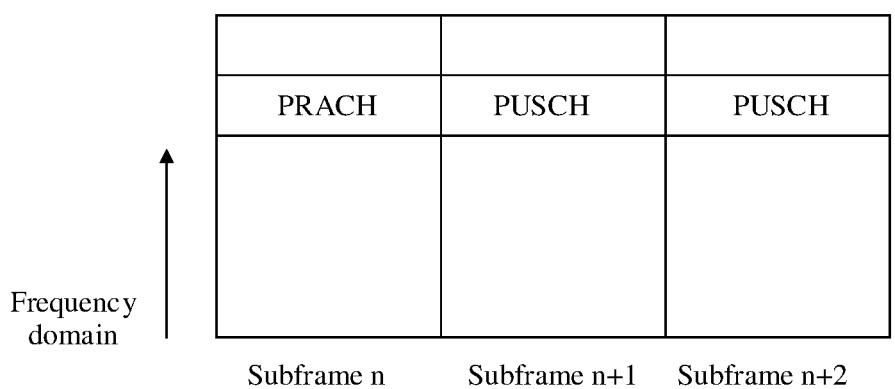
FIG. 12b is a schematic diagram of frequency division multiplexing of a PRACH resource and a PUSCH resource according to an embodiment of this application.

Optionally, in this embodiment of this application, as shown in FIG. 12a, the PRACH resource and the PUSCH resources that are configured by the network device for the terminal device may be frequency division multiplexed. Alternatively, as shown in FIG. 12b, the PRACH resource and the PUSCH resources that are configured by the network device for the terminal device may be time division multiplexed. Alternatively, the PRACH resource and the PUSCH resources that are configured by the network device for the terminal device may be both frequency division multiplexed and time division multiplexed. This is not specifically limited in embodiments of this application.

S702. The terminal device determines whether to send uplink data.

S703. The network device determines whether to receive the uplink data.

In this embodiment of this application, a procedure in which the network device determines whether to receive the uplink data is similar to a procedure in which the terminal device determines whether to send the uplink data in step S702. The terminal device may determine, according to a procedure shown in FIG. 13a, whether to send the uplink data. The procedure includes the following steps.

S1301a. The terminal device determines whether a first PRACH resource is valid.

The first PRACH resource is any PRACH resource in the PRACH resource set, and the first PRACH resource is associated with one or more PUSCH resources.

In this embodiment of this application, if the first PRACH resource is valid, step S1302a is performed; if the first PRACH resource is invalid, the terminal device continues to determine, in the following manners of determining whether the first PRACH resource is valid, whether a PRACH resource, other than the first PRACH resource, in the PRACH resource set is valid (as shown in step S1305a).

Optionally, in this embodiment of this application, the terminal device may obtain actual configuration information of a frame structure or a slot by listening to a broadcast message (such as a MIB or a SIB) or a downlink control information (DCI) sent by the network device. The terminal device then determines, based on the frame structure or the slot, validity of a PRACH resource preconfigured by the network device.

In this embodiment of this application, when determining the validity of the PRACH resource based on the frame structure or the slot, the terminal device may determine, in one or more of the following manners, whether the PRACH resource is valid. For example, determining may be performed in one manner. In other words, only a condition in the determining manner needs to be met. Alternatively, determining may be performed based on a combination of a plurality of manners. In other words, conditions in the plurality of determining manners are all met.

This is not specifically limited in embodiments of this application.

Manner 1: When the PRACH resource does not include a downlink time unit, the terminal device determines whether an interval 1 between a start time unit in the PRACH resource and a downlink time unit 1 before the start time unit is greater than or equal to a threshold 1. If the interval 1 is greater than or equal to the threshold 1, the terminal device determines that the PRACH resource is valid. Alternatively, the terminal device determines whether an interval 1 between a start time unit in the PRACH resource and a downlink time unit 1 before the start time unit is greater than a threshold 1. If the interval 1 is greater than the threshold 1, the terminal device determines that the PRACH resource is valid.

A time unit may be a subframe, or may be a slot, or may be an OFDM symbol. The interval 1 and/or the threshold 1 may be in a unit of the foregoing time unit. This is not specifically limited in embodiments of this application. The threshold 1 may be related to a subcarrier spacing. For example, when the subcarrier spacing is 15 KHz, the threshold 1 may be two OFDM symbols. The threshold 1 may be configured by the network device, or may be specified in a protocol. This is not specifically limited in embodiments of this application. Optionally, in this embodiment of this application, when a value of the threshold 1 is 0, it may be understood that the PRACH resource does not overlap the downlink time unit 1. When the value of the threshold 1 is greater than 0, it may be understood that the PRACH resource does not overlap the downlink time unit 1, and there is an interval between the PRACH resource and the downlink time unit 1.

Figure 14A:
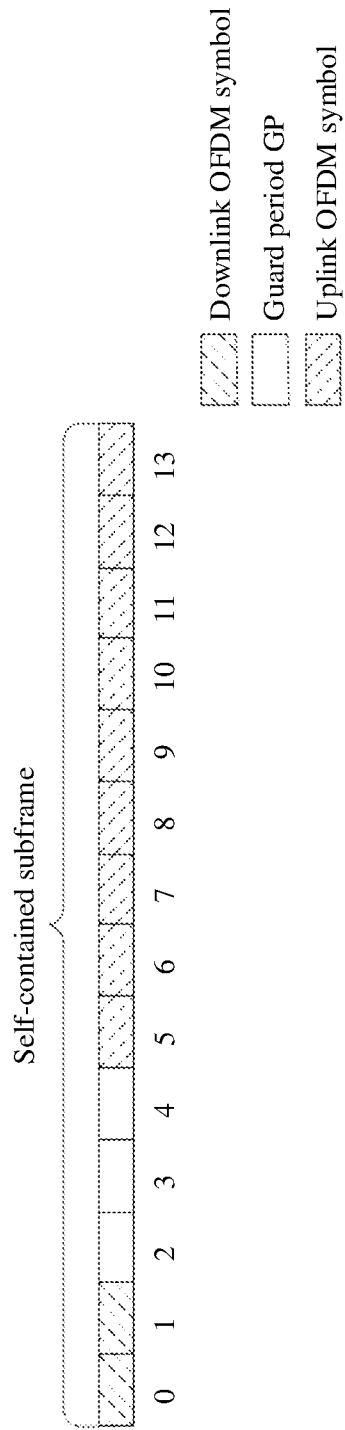
FIG. 14a is a schematic diagram 1 of determining resource validity according to an embodiment of this application.

For example, as shown in FIG. 14a, an example is used for description. The example is as follows: The time unit is an OFDM symbol, the first threshold is two OFDM symbols, and an actual frame structure is a self-contained subframe (to be specific, a part of the subframe is used for uplink transmission, and a part of the subframe is used for downlink transmission). The first two OFDM symbols of the self-contained subframe are used for downlink transmission, the following three OFDM symbols are used as a guard period, and the last nine OFDM symbols are used for uplink transmission. In this scenario, if the network device preconfigures the last nine OFDM symbols as the PRACH resource, the start time unit in the PRACH resource is an OFDM symbol numbered 5, and the downlink time unit 1 before the start time unit is an OFDM symbol numbered 1. There is no uplink or downlink time unit between the start time unit and the downlink time unit 1. There are three OFDM symbols (numbered 2, 3, and 4) used as the guard period and between the downlink OFDM symbol numbered 1 and the uplink OFDM symbol numbered 5. That is, the interval 1 between the start time unit and the downlink time unit 1 is three OFDM symbols. The interval 1 is greater than the threshold 1. Therefore, the terminal device can determine that the PRACH resource is valid.

Figure 14B:
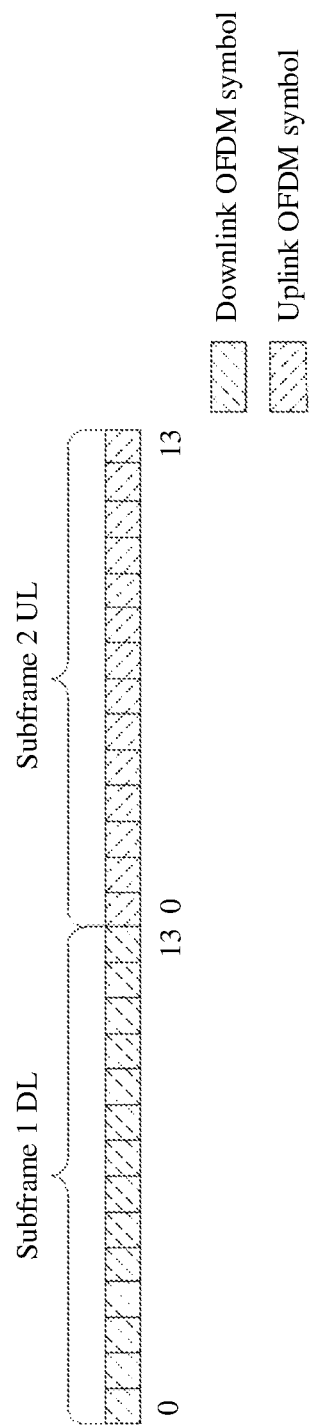
FIG. 14b is a schematic diagram 2 of determining resource validity according to an embodiment of this application.

Alternatively, for example, as shown in FIG. 14b, an example is used for description. The example is as follows: The time unit is an OFDM symbol, the threshold 1 is two OFDM symbols, and an actual frame structure is two consecutive subframes 1 and 2. The subframe 1 is a downlink subframe and includes 14 downlink OFDM symbols. The subframe 2 is an uplink subframe and includes 14 uplink OFDM symbols. In this scenario, if the network device preconfigures the subframe 2 as the PRACH resource, the start time unit in the PRACH resource is an uplink OFDM symbol numbered 0 in the subframe 2, and the downlink time unit 1 before the start time unit is a downlink OFDM symbol numbered 13 in the subframe 1. There is no guard period between the uplink OFDM symbol numbered 0 in the subframe 2 and the downlink OFDM symbol numbered 13 in the subframe 1. That is, the interval 1 between the start time unit and the downlink time unit 1 is zero OFDM symbols. The interval 1 is less than the threshold 1. Therefore, the terminal device can determine that the PRACH resource is invalid.

Manner 2: When the PRACH resource does not include a downlink time unit, the terminal device determines whether an interval 2 between an end time unit in the PRACH resource and a downlink time unit 2 after the end time unit is greater than or equal to a threshold 2. If the interval 2 is greater than or equal to the threshold 2, the terminal device determines that the PRACH resource is valid. Alternatively, the terminal device determines whether an interval 2 between an end time unit in the PRACH resource and a downlink time unit 2 after the end time unit is greater than a threshold 2. If the interval 2 is greater than the threshold 2, the terminal device determines that the PRACH resource is valid.

A time unit may be a subframe, or may be a slot, or may be an OFDM symbol. The interval 2 and/or the threshold 2 may be in a unit of the foregoing time unit. This is not specifically limited in embodiments of this application. The threshold 2 may be related to a subcarrier spacing. For example, when the subcarrier spacing is 15 KHz, the threshold 2 may be two OFDM symbols. The threshold 2 may be configured by the network device, or may be specified in a protocol. This is not specifically limited in embodiments of this application. Optionally, in this embodiment of this application, when a value of the threshold 2 is 0, it may be understood that the PRACH resource does not overlap the downlink time unit 2. When the value of the threshold 2 is greater than 0, it may be understood that the PRACH resource does not overlap the downlink time unit 2, and there is an interval between the PRACH resource and the downlink time unit 2. It should be noted that the threshold 1 and the threshold 2 may be the same, or may be different. This is not specifically limited in embodiments of this application.

Figure 15A:
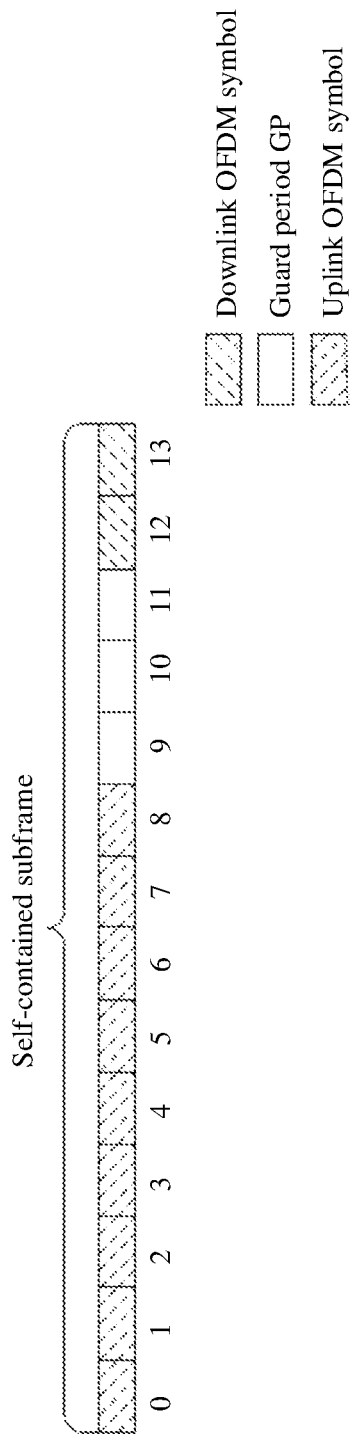
FIG. 15a is a schematic diagram 3 of determining resource validity according to an embodiment of this application.

For example, as shown in FIG. 15a, an example is used for description. The example is as follows: The time unit is an OFDM symbol, the threshold 2 is two OFDM symbols, and an actual frame structure is a self-contained subframe (to be specific, a part of the subframe is used for uplink transmission, and a part of the subframe is used for downlink transmission). The first nine OFDM symbols of the self-contained subframe are used for uplink transmission, the following three OFDM symbols are used as a guard period, and the last two OFDM symbols are used for downlink transmission. In this scenario, if the network device preconfigures the first nine OFDM symbols as the PRACH resource, the end time unit in the PRACH resource is an OFDM symbol numbered 8, and the downlink time unit 2 after the end time unit is an OFDM symbol numbered 12. There is no uplink or downlink time unit between the end time unit and the downlink time unit 2. There are three OFDM symbols (numbered 9, 10, and 11) used as the guard period and between the downlink OFDM symbol numbered 8 and the uplink OFDM symbol numbered 12. That is, the interval 2 between the end time unit and the downlink time unit 2 is three OFDM symbols. The interval 2 is greater than the threshold 2. Therefore, the terminal device can determine that the PRACH resource is valid.

Figure 15B:
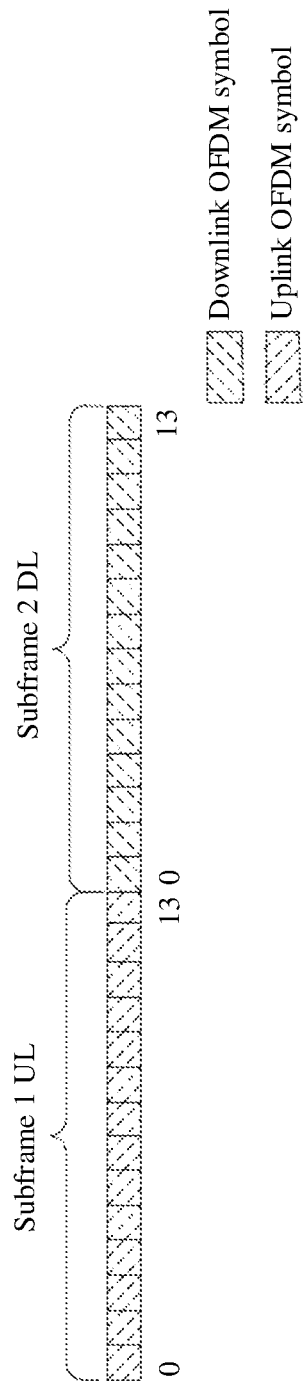
FIG. 15b is a schematic diagram 4 of determining resource validity according to an embodiment of this application.

Alternatively, for example, as shown in FIG. 15b, an example is used for description. The example is as follows: The time unit is an OFDM symbol, the threshold 2 is two OFDM symbols, and an actual frame structure is two consecutive subframes 1 and 2. The subframe 1 is an uplink subframe and includes 14 uplink OFDM symbols. The subframe 2 is a downlink subframe and includes 14 downlink OFDM symbols. In this scenario, if the network device preconfigures the subframe 1 as the PRACH resource, the end time unit in the PRACH resource is an uplink OFDM symbol numbered 13 in the subframe 1, and the downlink time unit 2 after the end time unit is a downlink OFDM symbol numbered 0 in the subframe 2. There is no guard period between the uplink OFDM symbol numbered 13 in the subframe 1 and the downlink OFDM symbol numbered 0 in the subframe 2. That is, the interval 2 between the end time unit and the downlink time unit 2 is zero OFDM symbols. The interval 2 is less than the threshold 2. Therefore, the terminal device can determine that the PRACH resource is invalid.

S1302a. The terminal device determines whether the PUSCH resources associated with the first PRACH resource are partially valid.

In this embodiment of this application, if the first PRACH resource is associated with only one PUSCH resource, the terminal device determines whether the PUSCH resource is valid. When the PUSCH resource is valid, the terminal device determines that the PUSCH resources associated with the first PRACH resource are partially valid (or all valid). Alternatively, if the first PRACH resource is associated with a plurality of PUSCH resources, the terminal device determines, one by one, whether the plurality of PUSCH resources associated with the first PRACH resource are valid. If at least one of the PUSCH resources is valid, the terminal device determines that the PUSCH resources associated with the first PRACH resource are partially or all valid. Otherwise, if there is no valid PUSCH resource, the terminal device determines that the plurality of PUSCH resources associated with the first PRACH resource are all invalid.

In this embodiment of this application, if the PUSCH resources associated with the first PRACH resource are partially valid, step S1303a is performed. Alternatively, if the PUSCH resources associated with the first PRACH resource are all invalid, step S1304a is performed.

Optionally, in this embodiment of this application, the terminal device may obtain the actual configuration information of the frame structure or the slot by listening to the broadcast message (such as the MIB or the SIB) or the DCI sent by the network device. The terminal device then determines, based on the frame structure or the slot, validity of a PUSCH resource preconfigured by the network device.

In this embodiment of this application, when determining the validity of the PUSCH resource based on the frame structure or the slot, the terminal device may determine, in one or more of the following manners, whether the PUSCH resource is valid. For example, determining may be performed in one manner. In other words, only a condition in the determining manner needs to be met. Alternatively, determining may be performed based on a combination of a plurality of manners. In other words, conditions in the plurality of determining manners are all met. This is not specifically limited in embodiments of this application.

Manner 1: When the PUSCH resource does not include a downlink time unit, the terminal device determines whether an interval 3 between a start time unit in the PUSCH resource and a downlink time unit 3 before the start time unit is greater than or equal to a threshold 3. If the interval 3 is greater than or equal to the threshold 3, the terminal device determines that the PUSCH resource is valid. Alternatively, the terminal device determines whether an interval 3 between a start time unit in the PUSCH resource and a downlink time unit 3 before the start time unit is greater than a threshold 3. If the interval 3 is greater than the threshold 3, the terminal device determines that the PUSCH resource is valid. In this embodiment of this application, the downlink time unit 3 may also be referred to as a first downlink time unit, the interval 3 may also be referred to as a first interval, and the threshold 3 may also be referred to as a first threshold. This is not specifically limited in embodiments of this application.

A time unit may be a subframe, or may be a slot, or may be an OFDM symbol. The interval 3 and/or the threshold 3 may be in a unit of the foregoing time unit. This is not specifically limited in embodiments of this application. The threshold 3 may be related to a subcarrier spacing. For example, when the subcarrier spacing is 15 KHz, the threshold 3 may be two OFDM symbols. The threshold 3 may be configured by the network device, or may be specified in a protocol. This is not specifically limited in embodiments of this application. Optionally, in this embodiment of this application, when a value of the threshold 3 is 0, it may be understood that the PUSCH resource does not overlap the downlink time unit 3. When the value of the threshold 3 is greater than 0, it may be understood that the PUSCH resource does not overlap the downlink time unit 3, and there is an interval between the PUSCH resource and the downlink time unit 3.

For example, as shown in FIG. 14a, an example is used for description. The example is as follows: The time unit is an OFDM symbol, the threshold 3 is two OFDM symbols, and an actual frame structure is a self-contained subframe (to be specific, a part of the subframe is used for uplink transmission, and a part of the subframe is used for downlink transmission). The first two OFDM symbols of the self-contained subframe are used for downlink transmission, the following three OFDM symbols are used as a guard period, and the last nine OFDM symbols are used for uplink transmission. In this scenario, if the network device preconfigures the last nine OFDM symbols as the PUSCH resource, the start time unit in the PUSCH resource is an OFDM symbol numbered 5, and the downlink time unit 3 before the start time unit is an OFDM symbol numbered 1. There is no uplink or downlink time unit between the start time unit and the downlink time unit 3. There are three OFDM symbols (numbered 2, 3, and 4) used as the guard period and between the downlink OFDM symbol numbered 1 and the uplink OFDM symbol numbered 5. That is, the interval 3 between the start time unit and the downlink time unit 3 is three OFDM symbols. The interval 3 is greater than the threshold 3. Therefore, the terminal device can determine that the PUSCH resource is valid.

Alternatively, for example, as shown in FIG. 14b, an example is used for description. The example is as follows: The time unit is an OFDM symbol, the threshold 3 is two OFDM symbols, and an actual frame structure is two consecutive subframes 1 and 2. The subframe 1 is a downlink subframe and includes 14 downlink OFDM symbols. The subframe 2 is an uplink subframe and includes 14 uplink OFDM symbols. In this scenario, if the network device preconfigures the subframe 2 as the PUSCH resource, the start time unit in the PUSCH resource is an uplink OFDM symbol numbered 0 in the subframe 2, and the downlink time unit 3 before the start time unit is a downlink OFDM symbol numbered 13 in the subframe 1. There is no guard period between the uplink OFDM symbol numbered 0 in the subframe 2 and the downlink OFDM symbol numbered 13 in the subframe 1. That is, the interval 3 between the start time unit and the downlink time unit 3 is zero OFDM symbols. The interval 3 is less than the threshold 3. Therefore, the terminal device can determine that the PUSCH resource is invalid.

Manner 2: When the PUSCH resource does not include a downlink time unit, the terminal device determines whether an interval 4 between an end time unit in the PUSCH resource and a downlink time unit 4 after the end time unit is greater than or equal to a threshold 4. If the interval 4 is greater than or equal to the threshold 4, the terminal device determines that the PUSCH resource is valid. Alternatively, the terminal device determines whether an interval 4 between an end time unit in the PUSCH resource and a downlink time unit 4 after the end time unit is greater than a threshold 4. If the interval 4 is greater than the threshold 4, the terminal device determines that the PUSCH resource is valid. In this embodiment of this application, the downlink time unit 4 may also be referred to as a second downlink time unit, the interval 4 may also be referred to as a second interval, and the threshold 4 may also be referred to as a second threshold. This is not specifically limited in embodiments of this application.

A time unit may be a subframe, or may be a slot, or may be an OFDM symbol. The interval 4 and/or the threshold 4 may be in a unit of the foregoing time unit. This is not specifically limited in embodiments of this application. The threshold 4 may be related to a subcarrier spacing. For example, when the subcarrier spacing is 15 KHz, the threshold 4 is two OFDM symbols. The threshold 4 may be configured by the network device, or may be specified in a protocol. This is not specifically limited in embodiments of this application. It should be noted that the threshold 3 and the threshold 4 may be the same, or may be different. This is not specifically limited in embodiments of this application. Optionally, in this embodiment of this application, when a value of the threshold 4 is 0, it may be understood that the PUSCH resource does not overlap the downlink time unit 4. When the value of the threshold 4 is greater than 0, it may be understood that the PUSCH resource does not overlap the downlink time unit 4, and there is an interval between the PUSCH resource and the downlink time unit 4.

For example, as shown in FIG. 15a, an example is used for description. The example is as follows: The time unit is an OFDM symbol, the threshold 4 is two OFDM symbols, and an actual frame structure is a self-contained subframe (to be specific, a part of the subframe is used for uplink transmission, and a part of the subframe is used for downlink transmission). The first nine OFDM symbols of the self-contained subframe are used for uplink transmission, the following three OFDM symbols are used as a guard period, and the last two OFDM symbols are used for downlink transmission. In this scenario, if the network device preconfigures the first nine OFDM symbols as the PUSCH resource, the end time unit in the PUSCH resource is an OFDM symbol numbered 8, and the downlink time unit 4 after the end time unit is an OFDM symbol numbered 12. There is no uplink or downlink time unit between the end time unit and the downlink time unit 4. There are three OFDM symbols (numbered 9, 10, and 11) used as the guard period and between the downlink OFDM symbol numbered 8 and the uplink OFDM symbol numbered 12. That is, the interval 4 between the end time unit and the downlink time unit 4 is three OFDM symbols. The interval 4 is greater than the threshold 4. Therefore, the terminal device can determine that the PUSCH resource is valid.

Alternatively, for example, as shown in FIG. 15b, an example is used for description. The example is as follows: The time unit is an OFDM symbol, the threshold 4 is two OFDM symbols, and an actual frame structure is two consecutive subframes 1 and 2. The subframe 1 is an uplink subframe and includes 14 uplink OFDM symbols. The subframe 2 is a downlink subframe and includes 14 downlink OFDM symbols. In this scenario, if the network device preconfigures the subframe 1 as the PUSCH resource, the end time unit in the PUSCH resource is an uplink OFDM symbol numbered 13 in the subframe 1, and the downlink time unit 4 after the end time unit is a downlink OFDM symbol numbered 0 in the subframe 2. There is no guard period between the uplink OFDM symbol numbered 13 in the subframe 1 and the downlink OFDM symbol numbered 0 in the subframe 2. That is, the interval 4 between the end time unit and the downlink time unit 4 is zero OFDM symbols. The interval 4 is less than the threshold 4. Therefore, the terminal device can determine that the PUSCH resource is invalid.

Manner 3: The terminal device determines whether a ratio of a quantity of actually available uplink time units or resource units in the PUSCH resource preconfigured by the network device to a quantity of time units or resource units occupied by the preconfigured PUSCH resource is greater than or equal to a third threshold. When the ratio is greater than or equal to the third threshold, the terminal device determines that the PUSCH resource is valid. Alternatively, the terminal device determines whether a ratio of a quantity of actually available uplink time units or resource units in the PUSCH resource preconfigured by the network device to a quantity of time units or resource units occupied by the preconfigured PUSCH resource is greater than a third threshold. When the ratio is greater than the third threshold, the terminal device determines that the PUSCH resource is valid. Alternatively, the terminal device determines whether a maximum bit rate that can be used when the uplink data is sent on the actually available time unit or resource unit is less than or equal to the third threshold, or is less than the third threshold. If the maximum bit rate is less than or equal to the third threshold, or is less than the third threshold, the terminal device determines that the PUSCH resource is valid. Alternatively, the third threshold may be a modulation and coding scheme (MSC) number, and the MSC number corresponds to a bit rate or spectral efficiency. In this scenario, the terminal device determines whether a maximum bit rate that can be used when the uplink data is sent on the actually available time unit or resource unit is less than or equal to the bit rate corresponding to the MSC number, or is less than the bit rate corresponding to the MSC number. If the maximum bit rate is less than or equal to the bit rate corresponding to the MSC number, or is less than the bit rate corresponding to the MSC number, the terminal device determines that the PUSCH resource is valid.

A time unit may be a subframe, or may be a slot, or may be an OFDM symbol. This is not specifically limited in embodiments of this application. The third threshold may be configured by the network device, or may be specified in a protocol.

Optionally, when the network device configures the third threshold, the terminal device may receive first indication information from the network device. The first indication information indicates the third threshold. For example, the third threshold is carried in the first indication information. Alternatively, the third threshold is implicitly indicated rather than carried in the first indication information. This is not specifically limited in embodiments of this application.

Figure 16:
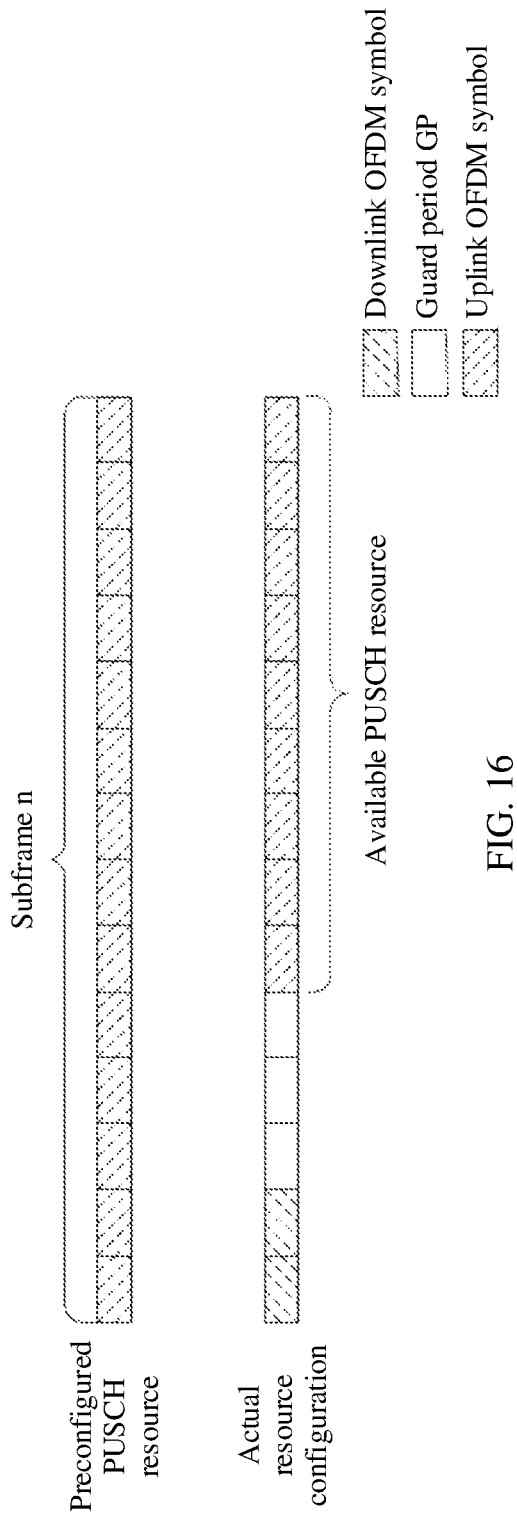
FIG. 16 is a schematic diagram 5 of determining resource validity according to an embodiment of this application.

For example, as shown in FIG. 16, an example is used for description. The example is as follows: The time unit is an OFDM symbol, the third threshold is 9/14, and an actual subframe structure is a subframe including 14 OFDM symbols. If a time domain length of the PUSCH resource preconfigured by the network device is 14 OFDM symbols, because the frame structure may dynamically change with time in a TDD system, an actually available PUSCH resource determined by the terminal device may be 10 OFDM symbols. In this case, a quantity of available PUSCH resources is reduced. In this scenario, the ratio of the quantity of actually available uplink time units in the preconfigured PUSCH resource to the quantity of time units occupied by the PUSCH resource is 10/14. The ratio is greater than the third threshold. Therefore, the terminal device can determine that the PUSCH resource is valid.

It should be noted that, in this embodiment of this application, when the terminal device determines, in the manner 3, that the PUSCH resource is valid, the actually available PUSCH resource is smaller than the PUSCH resource preconfigured by the network device. In this case, the terminal device may still use the actually available PUSCH resource to transmit the uplink data, thereby improving PUSCH resource utilization. However, a preamble sequence is a sequence in a fixed format, and when the network device preconfigures a PRACH resource, a format of the configured PRACH resource matches the format of the preamble sequence. Consequently, when an actually available PRACH resource is smaller than the PRACH resource preconfigured by the network device, the preamble sequence cannot be transmitted. Therefore, the foregoing manner 3 is only applicable to determining validity of a PUSCH resource, and is not applicable to determining validity of a PRACH resource.

Optionally, in this embodiment of this application, in one or more PUSCH resources that are associated with a PRACH resource and that are configured by the network device for the PRACH resource, a part of the PUSCH resources may include a plurality of resource segments. The plurality of resource segments are used for repeated transmission of a PUSCH. To be specific, each of the plurality of resource segments is used to transmit same uplink data. A same redundancy version or different redundancy versions may be used for the resource segments during retransmission. In this scenario, it may be considered that the PRACH resouce is associated with each of the plurality of resource segments. The terminal device may separately determine, in one or more of the foregoing three manners, whether each resource segment of the part of the PUSCH resources is valid. When at least one of the plurality of resource segments is valid, the terminal device determines that the part of the PUSCH resources including the plurality of resource segments is valid.

Optionally, in this embodiment of this application, a scenario in which an uplink resource preconfigured by the network device is invalid may also exist when validity determining is performed on the PRACH resource and the PUSCH resource in the foregoing possible determining manners. For example, in a possible scenario, preemption may exist for transmission of a high-priority user. To be specific, the network device may schedule another user to perform transmission on the PRACH resource or the PUSCH resource preconfigured by the network device for the terminal device. In this scenario, the network device sends an interrupted transmission indication (INT) message to the terminal device. The interrupted transmission indication message is used to indicate that the network device schedules said another user to perform transmission on the PRACH resource or the PUSCH resource of the terminal device. In this case, the PRACH resource or the PUSCH resource of the terminal device may be invalid.

S1303a. The terminal device determines to send a first preamble sequence to the network device on the first PRACH resource, and determines to send the uplink data to the network device on a first PUSCH resource associated with the first PRACH resource.

In this embodiment of this application, the first PUSCH resource is a valid PUSCH resource associated with the first PRACH resource, and the first preamble sequence is a preamble sequence in a preamble sequence set associated with the first PUSCH resource. Optionally, when the first PRACH resource is associated with a plurality of PUSCH resources, the first PUSCH resource is the first valid PUSCH resource. For example, in resource configuration shown in FIG. 10, if the PRACH resource is valid, the first PUSCH resource is a PUSCH resource of which ID is 2.

Optionally, when a second PUSCH resource associated with the first PRACH resource includes a plurality of resource segments, the first PUSCH resoure may be a valid resource segment in the second PUSCH resource. According to the solution, when a part of resource segments in a PUSCH resource including a plurality of resource segments are valid, the part of valid resource segments may still be used for uplink transmission, thereby improving PUSCH resource utilization.

S1304a. The terminal device determines to send a second preamble sequence to the network device on the first PRACH resource, and skips sending the uplink data.

Figure 13A:
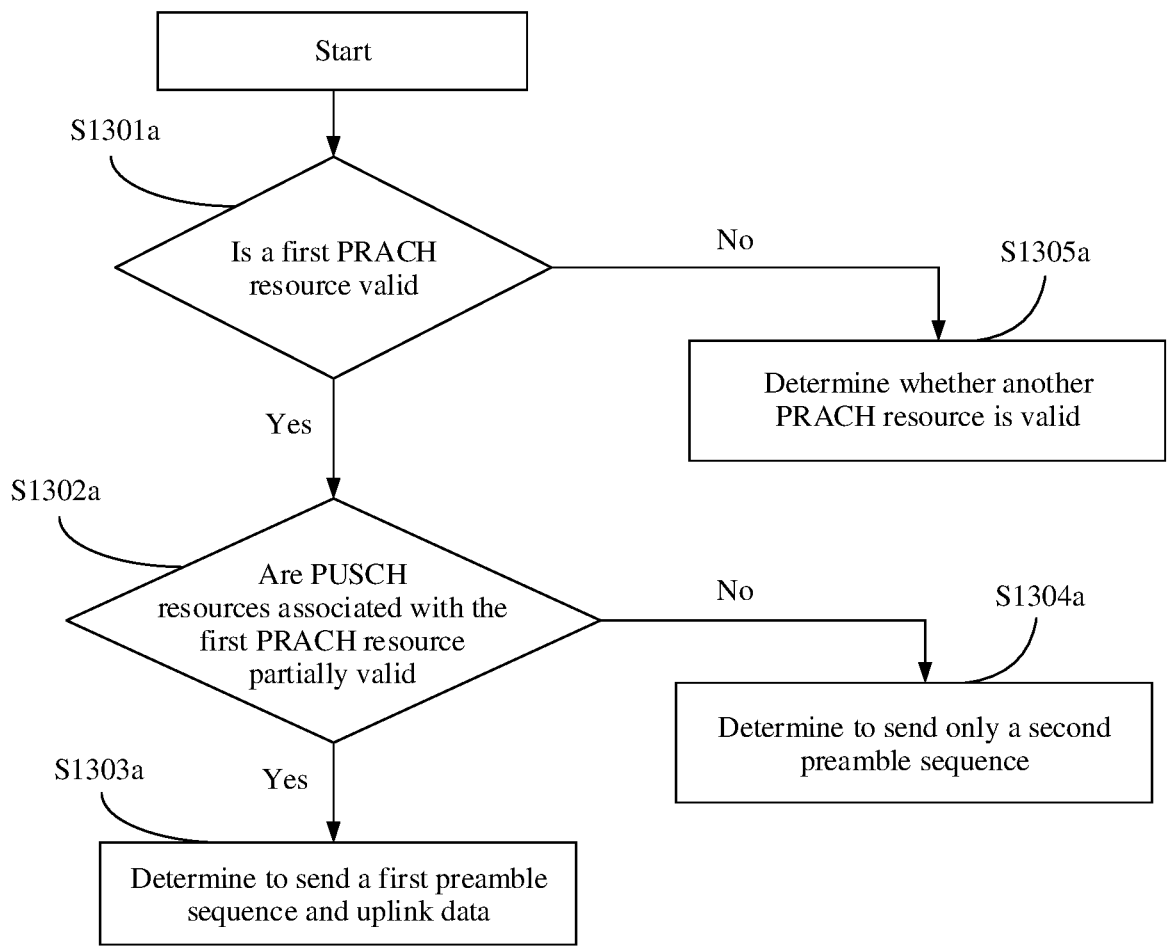
FIG. 13a is a flowchart of a method used by a terminal device to determine whether to send uplink data according to an embodiment of this application.

Further, in this embodiment of this application, after the terminal device determines, according to the procedure shown in FIG. 13a, whether to send the uplink data, if the terminal device performs step S1303a, as shown in FIG. 7, the terminal device continues to perform step S704a; if the terminal device performs step S1304a, as shown in FIG. 7, the terminal device continues to perform step S704b. In this embodiment of this application, the network device may determine, according to a procedure shown in FIG. 13b, whether to receive the uplink data. The procedure includes the following steps.

S1301b. The network device determines whether the first PRACH resource is valid.

In this embodiment of this application, if the first PRACH resource is valid, step S1302b is performed; if the first PRACH resource is invalid, the network device continues to determine, in the foregoing manner of determining whether the first PRACH resource is valid, whether a PRACH resource, other than the first PRACH resource, in the PRACH resource set is valid (as shown in step S1305b).

A method used by the network device to determine whether the first PRACH resource is valid is similar to the method used by the terminal device to determine whether the first PRACH resource is valid in the foregoing step S1301a. For related descriptions, refer to the foregoing step S1301a.

S1302b. The network device determines whether the PUSCH resources associated with the first PRACH resource are partially valid.

For related descriptions about a case in which the PUSCH resources associated with the first PRACH resource are partially valid, refer to the corresponding descriptions in step S1302a.

In this embodiment of this application, if the PUSCH resources associated with the first PRACH resource are partially valid, step S1303b is performed. Alternatively, if the PUSCH resources associated with the first PRACH resource are all invalid, step S1304b is performed.

A method used by the network device to determine whether the PUSCH resources associated with the first PRACH resource are partially valid is similar to the method used by the terminal device to determine whether the PUSCH resources associated with the first PRACH resource are partially valid in step S1301a. For related descriptions, refer to step S1301a.

S1303b. The network device determines to receive the first preamble sequence from the terminal device on the first PRACH resource, and determines to receive the uplink data from the terminal device on the first PUSCH resource associated with the first PRACH resource.

For related descriptions of the first PUSCH resource and the first preamble sequence, refer to the corresponding descriptions in step S1303a.

S1304b. The network device determines to receive the second preamble sequence from the terminal device on the first PRACH resource, and skips receiving the uplink data.

Figure 13B:
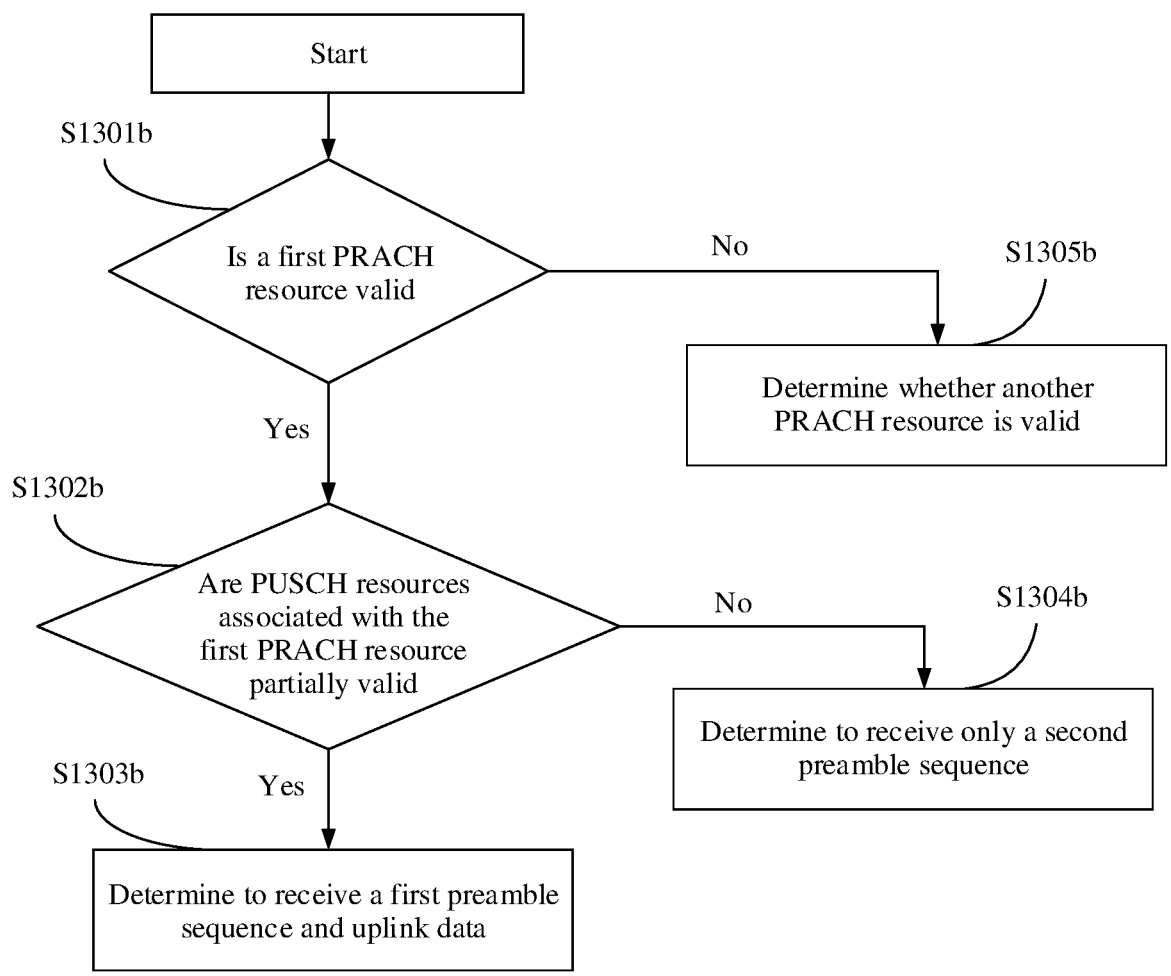
FIG. 13b is a flowchart of a method used by a network device to determine whether to receive uplink data according to an embodiment of this application.

Further, in this embodiment of this application, after the terminal device determines, according to the procedure shown in FIG. 13b, whether to receive the uplink data, if the network device performs step S1303b, as shown in FIG. 7, the network device continues to perform step S704a; if the network device performs step S1304b, as shown in FIG. 7, the terminal device continues to perform step S704b.

It should be noted that in one random access procedure, a manner in which the network device determines validity of a PRACH resource and a PUSCH resource needs to be consistent with a manner in which the terminal device determines the validity of the PRACH resource and the PUSCH resource. For example, if the terminal device determines the validity of the PRACH resource in the manner 1 in step S1301a, the network device also needs to determine the validity of the PRACH resource in the manner 1 in step S1301a. If the terminal device determines the validity of the PUSCH resource in the manner 2 in step S1302a, the network device also needs to determine the validity of the PUSCH resource in the manner 2 in step S1302a. A determining manner used by the terminal device and the network device may be agreed on in a protocol, or may be notified by the network device to the terminal device. This is not specifically limited in embodiments of this application.

S704a. The terminal device sends the first preamble sequence to the network device on the first PRACH resource, and sends the uplink data to the network device on the first PUSCH resource associated with the first PRACH resource. The network device receives the first preamble sequence from the terminal device on the first PRACH resource, and receives the uplink data from the terminal device on the first PUSCH resource associated with the first PRACH resource.

Optionally, in this embodiment of this application, when determining, in the manner 3 in the foregoing step S1302a, that the PUSCH resource is valid, the terminal device can perform rate matching or puncturing, to ensure uplink data transmission. For example, there are a total of K to-be-transmitted modulation symbols corresponding to K resource units in the preconfigured uplink resource, M bits are transmitted on each resource unit, and a bit rate is R. Therefore, a total of K·M·R information bits are transmitted. If a quantity of the resource units is reduced to $K_1$, the rate matching may be performed. To be specific, a new bit rate $R_1$ is used, so that $K \cdot M \cdot R = K_1 \cdot M \cdot R_1$. Alternatively, the puncturing may be performed. To be specific, coding and modulation are performed by using the original bit rate, and only K 1 corresponding modulation symbols are transmitted.

S704b. The terminal device sends the second preamble sequence to the network device on the first PRACH resource, and skips sending the uplink data. The network device receives the second preamble sequence from the terminal device on the first PRACH resource, and skips receiving the uplink data.

It should be noted that there is no strict execution sequence between step S702 and step S703. S702 may be performed before S703, or S703 may be performed before S702, or S702 and S703 may be simultaneously performed. This is not specifically limited in embodiments of this application.

According to the random access method provided in this embodiment of this application, for 2-step RACH procedures, the terminal device determines whether a PRACH resource is valid. When the PRACH resource is valid, the terminal device determines whether PUSCH resources associated with the PRACH resource are partially valid. When the PUSCH resources associated with the PRACH resource are partially valid, the terminal device sends the first preamble sequence to the network device on the valid PRACH resource, and sends the uplink data to the network device on the part of valid PUSCH resources, thereby reducing a transmission latency of the uplink data, and improving PUSCH resource utilization. When the PRACH resource is valid, and the PUSCH resources associated with the PRACH resource are all invalid, the terminal device sends the second preamble sequence to the network device on the PRACH resource, and skips sending the uplink data, thereby improving PRACH resource utilization. Therefore, a problem in random access that the PRACH resource is valid and the PUSCH resources associated with the PRACH resource may be invalid is resolved, an access latency is reduced, and resource utilization is improved.

The processor 301 in the network device 30 shown in FIG. 5 may invoke application program code stored in the memory 302, to indicate the network device to perform the actions of the network device in steps S701 to S704a or S704b. The processor 401 in the terminal device 40 shown in FIG. 5 may invoke application program code stored in the memory 402, to indicate the network device to perform the actions of the terminal device in steps S701 to S704a or S704b. This is not limited in embodiments of the present disclosure.

The processor 401 in the terminal device 40 shown in FIG. 5 may invoke application program code stored in the memory 402, to indicate the network device to perform the actions of the terminal device in foregoing steps S1301a to S1303a, or S1301a to S1305a, or S1301a to S1304a. This is not limited in embodiments of the present disclosure.

Figure 17:
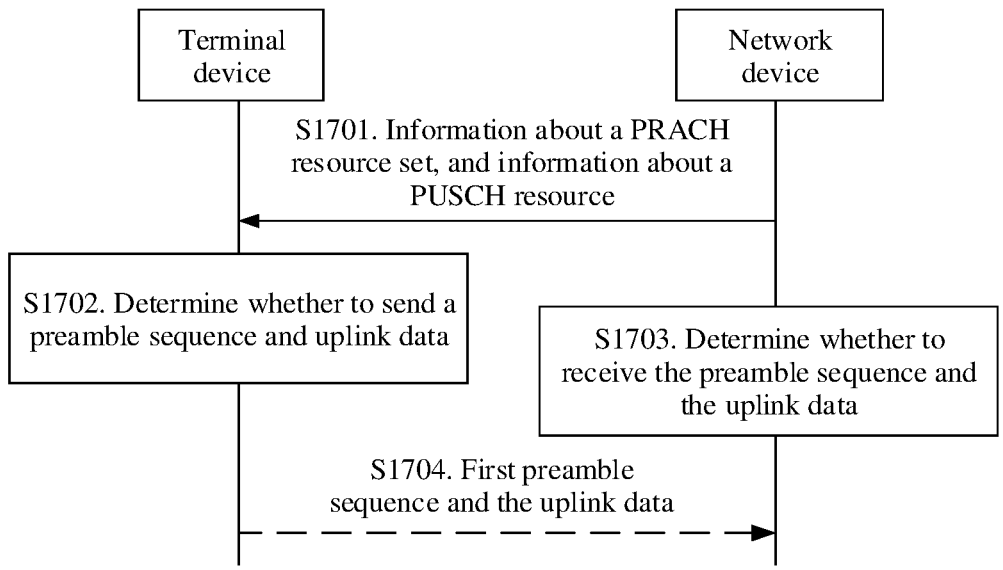
FIG. 17 is a schematic flowchart 2 of a random access method according to an embodiment of this application.

FIG. 17 shows another random access method according to an embodiment of this application. The random access method includes the following steps.

S1701. A network device sends, to a terminal device, information about a PRACH resource set and information about one or more PUSCH resources associated with each PRACH resource in the PRACH resource set. Correspondingly, the terminal device receives, from the network device, the information about the PRACH resource set and the information about the one or more PUSCH resources associated with each PRACH resource in the PRACH resource set.

A specific implementation is similar to step S701. For related descriptions, refer to step S701.

S1702. The terminal device determines whether to send a preamble sequence and uplink data.

S1703. The network device determines whether to receive the preamble sequence and the uplink data.

In this embodiment of this application, a procedure in which the network device determines whether to receive the preamble sequence and the uplink data is similar to the procedure in which the terminal device determines whether to send the preamble sequence and the uplink data in step S1702. The terminal device may determine, according to a procedure shown in FIG. 18a, whether to send the preamble sequence and the uplink data. The procedure includes the following steps.

S1801a. The terminal device determines whether a first PRACH resource is valid.

The first PRACH resource is any PRACH resource in the PRACH resource set, and the first PRACH resource is associated with one or more PUSCH resources.

In this embodiment of this application, a manner in which the terminal device determines whether the first PRACH resource is valid is similar to the manner in which the terminal device determines whether the first PRACH resource is valid in step S1301a. For related descriptions, refer to step S1301a.

In this embodiment of this application, if the first PRACH resource is valid, step S1802a is performed; if the first PRACH resource is invalid, the terminal device continues to determine, in the foregoing manners of determining whether the first PRACH resource is valid, whether a PRACH resource, other than the first PRACH resource, in the PRACH resource set is valid (as shown in step S1805a).

S1802a. The terminal device determines whether the PUSCH resources associated with the first PRACH resource are partially valid.

In this embodiment of this application, a manner in which the terminal device determines whether a PUSCH resource associated with the first PRACH resource is partially valid is similar to step S1302a. For related descriptions, refer to step S1302a.

In this embodiment of this application, if the PUSCH resources associated with the first PRACH resource are partially valid, step S1803a is performed; if the PUSCH resources associated with the first PRACH resource are all invalid, the terminal device continues to determine, in the foregoing manners of determining whether the first PRACH resource is valid, whether a PRACH resource, other than the first PRACH resource, in the PRACH resource set is valid (as shown in step S1804a).

S1803a. The terminal device determines to send a first preamble sequence to the network device on the first PRACH resource, and determines to send the uplink data to the network device on a first PUSCH resource associated with the first PRACH resource.

A specific implementation is similar to the foregoing step S1303a. For related descriptions, refer to the foregoing step S1303a.

Figure 18A:
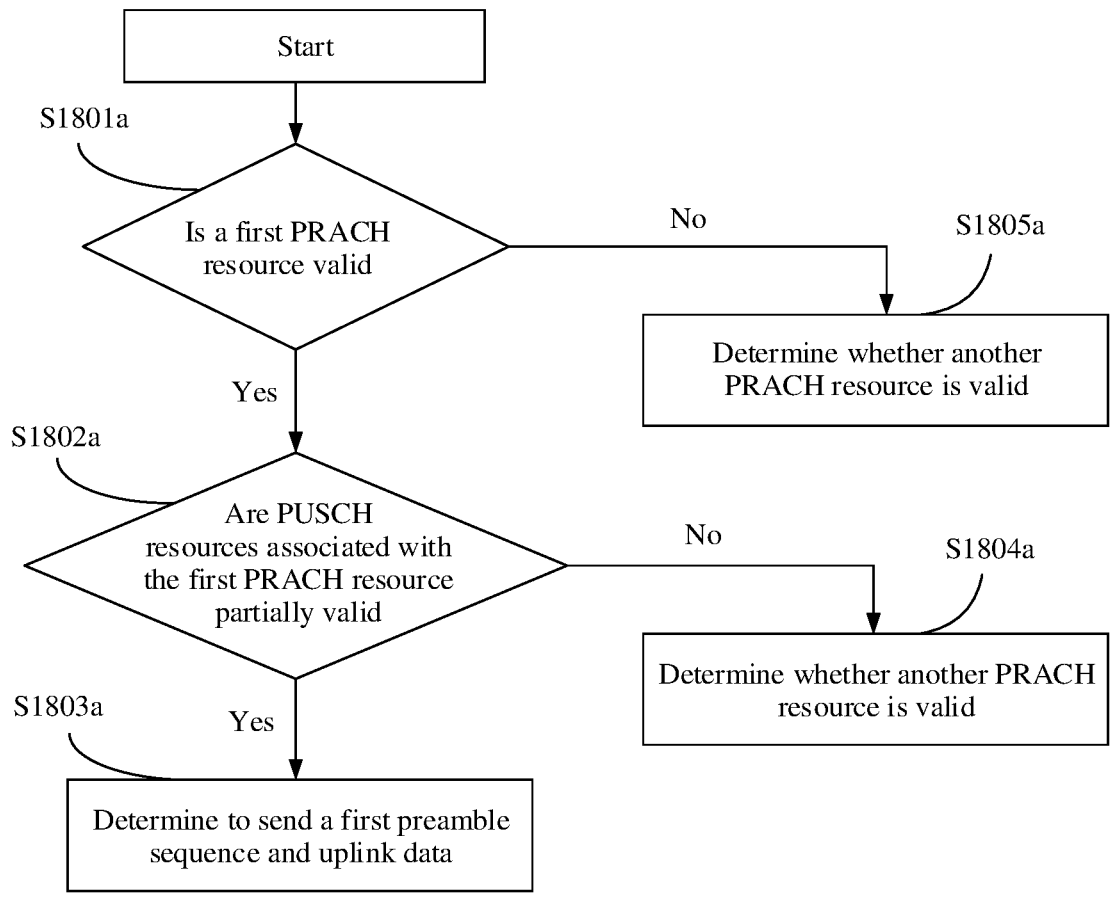
FIG. 18a is a flowchart of a method used by a terminal device to determine whether to send a preamble sequence and uplink data according to an embodiment of this application.

Further, in this embodiment of this application, after the terminal device determines, according to the procedure shown in FIG. 18a, whether to send the preamble sequence and the uplink data, if the terminal device performs step S1803a, the terminal device continues to perform step S1704, as shown in FIG. 17.

Figure 18B:
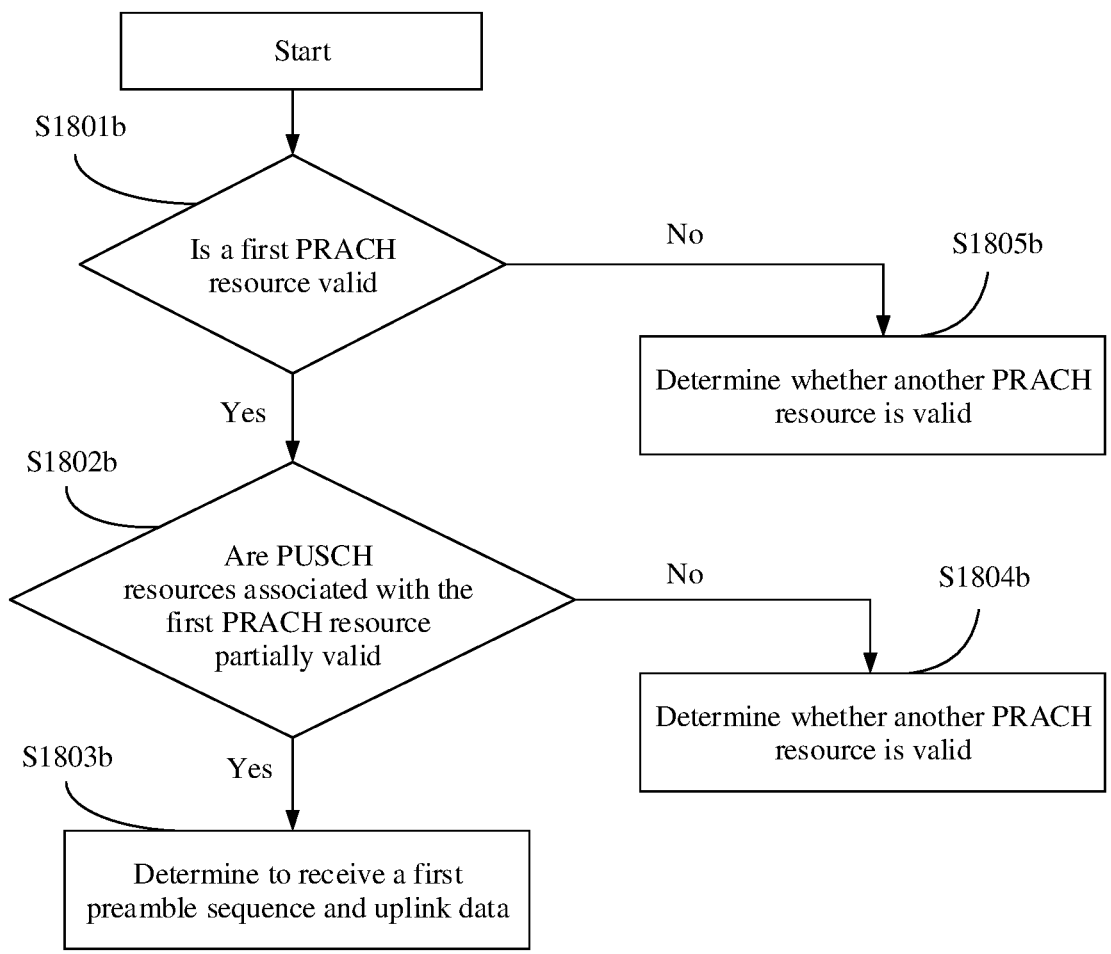
FIG. 18b is a flowchart of a method used by a network device to determine whether to receive a preamble sequence and uplink data according to an embodiment of this application.

In this embodiment of this application, the network device may determine, according to a procedure shown in FIG. 18b, whether to receive the preamble sequence and the uplink data. The procedure includes the following steps.

S1801b. The network device determines whether the first PRACH resource is valid.

In this embodiment of this application, if the first PRACH resource is valid, step S1802b is performed; if the first PRACH resource is invalid, the terminal device continues to determine, in the foregoing manners of determining whether the first PRACH resource is valid, whether a PRACH resource, other than the first PRACH resource, in the PRACH resource set is valid (as shown in step S1805b).

In this embodiment of this application, a manner in which the terminal device determines whether the first PRACH resource is valid is similar to the manner in which the terminal device determines whether the first PRACH resource is valid in step S1301a. For related descriptions, refer to step S1301a.

S1802b. The network device determines whether the PUSCH resources associated with the first PRACH resource are partially valid.

In this embodiment of this application, a manner in which the network device determines whether the PUSCH associated with the first PRACH resource is partially valid is similar to step S1302a. For related descriptions, refer to step S1302a.

In this embodiment of this application, if the PUSCH resources associated with the first PRACH resource are partially valid, step S1803b is performed; if the PUSCH resources associated with the first PRACH resource are all invalid, the terminal device continues to determine, in the foregoing manners of determining whether the first PRACH resource is valid, whether a PRACH resource, other than the first PRACH resource, in the PRACH resource set is valid (as shown in step S1804b).

S1803b. The network device determines to receive the first preamble sequence from the terminal device on the first PRACH resource, and determines to receive the uplink data from the terminal device on the first PUSCH resource associated with the first PRACH resource.

For related descriptions of the first PUSCH resource and the first preamble sequence, refer to the corresponding descriptions in step S1303a.

Further, in this embodiment of this application, after the network device determines, according to the procedure shown in FIG. 18b, whether to receive the preamble sequence and the uplink data, if the network device performs step S1803b, the network device continues to perform step S1704, as shown in FIG. 17.

It should be noted that in one random access procedure, a manner in which the network device determines validity of a PRACH resource and a PUSCH resource needs to be consistent with a manner in which the terminal device determines the validity of the PRACH resource and the PUSCH resource. For example, if the terminal device determines the validity of the PRACH resource in the manner 1 in step S1301a, the network device also needs to determine the validity of the PRACH resource in the manner 1 in step S1301a. If the terminal device determines the validity of the PUSCH resource in the manner 2 in step S1302a, the network device also needs to determine the validity of the PUSCH resource in the manner 2 in step S1302a. A determining manner used by the terminal device and the network device may be specified in a protocol, or may be notified by the network device to the terminal device. This is not specifically limited in embodiments of this application.

S1704. The terminal device sends the first preamble sequence to the network device on the first PRACH resource, and sends the uplink data to the network device on the first PUSCH resource associated with the first PRACH resource. The network device receives the first preamble sequence from the terminal device on the first PRACH resource, and receives the uplink data from the terminal device on the first PUSCH resource associated with the first PRACH resource.

It should be noted that there is no strict execution sequence between step S1702 and step S1703. S1702 may be performed before S1703, or S1703 may be performed before S1702, or S1702 and S1703 may be simultaneously performed. This is not specifically limited in embodiments of this application.

According to the random access method provided in this embodiment of this application, for 2-step RACH procedures, the terminal device determines whether a PRACH resource is valid. When the PRACH resource is valid, the terminal device determines whether PUSCH resources associated with the PRACH resource are partially valid. When the PUSCH resources associated with the PRACH resource are partially valid, the terminal device sends the first preamble sequence to the network device on the valid PRACH resource, and sends the uplink data to the network device on the part of valid PUSCH resources, thereby reducing a transmission latency of the uplink data, and improving PUSCH resource utilization. When the PRACH resource is valid, and the PUSCH resources associated with the PRACH resource are all invalid, the terminal device continues to determine whether next PRACH resource is valid. Therefore, a problem in random access that the PRACH resource is valid and the PUSCH resources associated with the PRACH resource may be invalid is resolved, an access latency is reduced, and resource utilization is improved.

The processor 301 in the network device 30 shown in FIG. 5 may invoke application program code stored in the memory 302, to indicate the network device to perform the actions of the network device in steps S1701 to S1704. The processor 401 in the terminal device 40 shown in FIG. 5 may invoke application program code stored in the memory 402, to indicate the network device to perform the actions of the terminal device in steps S1701 to S1704. This is not limited in embodiments of the present disclosure.

The processor 401 in the terminal device 40 shown in FIG. 5 may invoke application program code stored in the memory 402, to indicate the network device to perform the actions of the terminal device in foregoing steps S1801a to S1803a, or S1801a to S1805a, or S1801a to S1804a. This is not limited in embodiments of the present disclosure.

Optionally, in this embodiment of this application, before performing step S1702, the terminal device may receive second indication information from the network device. The second indication information indicates the terminal device to determine, according to the procedure shown in FIG. 13a, whether to send the uplink data. To be specific, the second indication information indicates that when there is a valid PRACH resource, and PUSCH resources associated with the valid PRACH resource are all invalid, the terminal device sends the preamble sequence on the valid PRACH resource, and skips sending the uplink data.

Optionally, in this embodiment of this application, before performing step S1702, the terminal device may receive third indication information from the network device. The third indication information indicates the terminal device to determine, according to the procedure shown in FIG. 18a, whether to send the preamble sequence and the uplink data. To be specific, the third indication information indicates that when there is a valid PRACH resource, and PUSCH resources associated with the valid PRACH resource are all invalid, the terminal device continues to determine whether another PRACH resource in the PRACH resource set is valid.

The second indication information and the third indication information may be carried in a same message, and may be represented by using a same bit. For example, when the bit is a binary value "1", it indicates the second indication information, and when the bit is a binary value "0", it indicates the third indication information. Certainly, the second indication information and the third indication information may alternatively be represented in another form. This is not specifically limited in embodiments of this application.

It may be understood that, in the foregoing embodiments, methods and/or steps implemented by the terminal device may also be implemented by a component (for example, a chip or a circuit) that can be used in the terminal device, and methods and/or steps implemented by the network device may also be implemented by a component (for example, a chip or a circuit) that can be used in the network device.

The foregoing mainly describes the solutions provided in the embodiments of this application from a perspective of interaction between the network elements. Correspondingly, an embodiment of this application further provides a communications apparatus, and the communications apparatus is configured to implement the foregoing methods. The communications apparatus may be the terminal device in the foregoing method embodiments, or an apparatus including the foregoing terminal device, or a component that can be used in the terminal device. Alternatively, the communications apparatus may be the network device in the foregoing method embodiments, or an apparatus including the foregoing network device, or a component that can be used in the network device. It can be understood that, to implement the foregoing functions, the communications apparatus includes a corresponding hardware structure and/or software module for performing the functions. A person skilled in the art should be easily aware that, in combination with the examples of units and algorithm steps described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement a described function for each particular application, but it should not be considered that the implementation goes beyond the scope of this application.

In the embodiments of this application, the communications apparatus may be divided into functional modules based on the foregoing method embodiments. For example, each functional module may be obtained through division based on each corresponding function, or two or more functions may be integrated into one processing module. The integrated module may be implemented in a form of hardware, or may be implemented in a form of a software functional module. It should be noted that, in the embodiments of this application, module division is an example, and is merely logical function division. There may be another division manner in an actual implementation.

Figure 19:
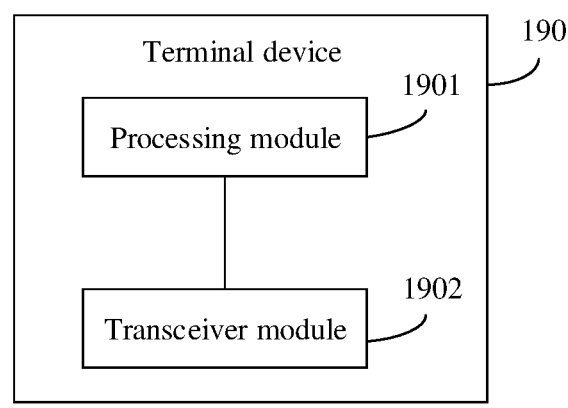
FIG. 19 is still another schematic structural diagram of a terminal device according to an embodiment of this application.

For example, the communications apparatus is the terminal device in the foregoing method embodiments. FIG. 19 is a schematic structural diagram of a terminal device 190. The terminal device 190 includes a processing module 1901 and a transceiver module 1902. The transceiver module 1902 may also be referred to as a transceiver unit, and is configured to implement a sending and/or receiving function, for example, may be a transceiver circuit, a transceiver, a transceiver, or a communications interface.

The processing module 1901 is configured to receive, from a network device via the transceiver module 1902, information about a PRACH resource set and information about one or more PUSCH resources associated with each PRACH resource in the PRACH resource set. Each PUSCH resource associated with each PRACH resource is associated with one preamble sequence set. The processing module 1901 is further configured to: if a first PUSCH resource associated with a valid first PRACH resource in the PRACH resource set is valid, send a first preamble sequence to the network device on the first PRACH resource via the transceiver module 1902, and send uplink data to the network device on the first PUSCH resource via the transceiver module 1902. The first preamble sequence is a preamble sequence in a preamble sequence set associated with the first PUSCH resource.

Optionally, the processing module 1901 is further configured to determine whether a first interval between a start time unit in the first PUSCH resource and a first downlink time unit before the start time unit is greater than a first threshold. The first PUSCH resource is a PUSCH resource that is in one or more PUSCH resources associated with the first PRACH resource and that does not include a downlink time unit. The processing module 1901 is further configured to: if the first interval is greater than the first threshold, determine that the first PUSCH resource is valid.

Optionally, the processing module 1901 is further configured to determine whether a second interval between an end time unit in the first PUSCH resource and a second downlink time unit after the end time unit is greater than a second threshold. The first PUSCH resource is a PUSCH resource that is in one or more PUSCH resources associated with the first PRACH resource and that does not include a downlink time unit. The processing module 1901 is further configured to: if the second interval is greater than the second threshold, determine that the first PUSCH resource is valid.

Optionally, the processing module 1901 is further configured to determine whether a ratio of a quantity of available uplink time units in the first PUSCH resource to a quantity of time units occupied by the first PUSCH resource is greater than a third threshold. The processing module 1901 is further configured to: if the ratio is greater than the third threshold, determine that the first PUSCH resource is valid.

Optionally, the processing module 1901 is further configured to receive first indication information from the network device via the transceiver module 1902. The first indication information indicates the third threshold.

Optionally, the processing module 1901 is further configured to: if the PUSCH resources associated with the first PRACH resource are all invalid, send a second preamble sequence to the network device on the first PRACH resource via the transceiver module 1902.

Optionally, the processing module 1901 is further configured to receive second indication information from the network device via the transceiver module 1902. The second indication information is used to indicate that when there is a valid PRACH resource, and PUSCH resources associated with the valid PRACH resource are all invalid, the terminal device sends a preamble sequence on the valid PRACH resource.

Optionally, the processing module 1901 is further configured to receive third indication information from the network device via the transceiver module 1902. The third indication information is used to indicate that when there is a valid PRACH resource, and PUSCH resources associated with the valid PRACH resource are all invalid, the terminal device skips sending a preamble sequence on the valid PRACH resource.

Optionally, that the processing module 1901 is configured to receive, via the transceiver module 1902, information about a PRACH resource set and information about one or more PUSCH resources associated with each PRACH resource in the PRACH resource set from a network device includes: the processing module 1901 is configured to receive a RACH configuration message from the network device via the transceiver module 1902. The RACH configuration message includes the information about the PRACH resource set and the information about the one or more PUSCH resources associated with each PRACH resource in the PRACH resource set. Each PUSCH resource associated with each PRACH resource is associated with one preamble sequence set.

In this embodiment of this application, that the processing module 1901 is configured to send the foregoing information or message via the transceiver module 1902 may be understood as follows: After obtaining the foregoing information or message, the processing module 1901 is configured to generate a signal carrying the foregoing information or message. The signal may be sent by the transceiver module 1902 with or without signal processing. Alternatively, in this embodiment of this application, that the processing module 1901 is configured to receive the foregoing information or message via the transceiver module 1902 may be understood as follows: After receiving a signal that is sent from the outside and that carries the foregoing information or message, the transceiver module 1902 sends, with or without signal processing, the signal to the processing module 1901 for processing. A general description is provided herein, and details are not described below. All related content of the steps in the foregoing method embodiments may be cited in function descriptions of corresponding functional modules.

In this embodiment, the terminal device 190 is presented in a form of functional modules obtained through division in an integrated manner. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the terminal device 190 may be in a form of the terminal device 40 shown in FIG. 5.

For example, the processor 401 in the terminal device 40 shown in FIG. 5 may invoke one or more computer-executable instructions stored in the memory 402, so that the terminal device 40 performs the random access method in the foregoing method embodiments.

Specifically, the processor 401 in the terminal device 40 shown in FIG. 5 may invoke the one or more computer-executable instructions stored in the memory 402, to implement functions/implementation processes of the processing module 1901 and the transceiver module 1902 in FIG. 19. Alternatively, the processor 401 in the terminal device 40 shown in FIG. 5 may invoke the one or more computer-executable instructions stored in the memory 402, to implement functions/implementation processes of the processing module 1901 in FIG. 19, and the transceiver 403 in the terminal device 40 shown in FIG. 5 may implement functions/implementation processes of the transceiver module 1902 in FIG. 19.

The terminal device 190 provided in this embodiment can perform the foregoing random access method. Therefore, for a technical effect that can be achieved by the terminal device 190, refer to the foregoing method embodiments.

Figure 20:
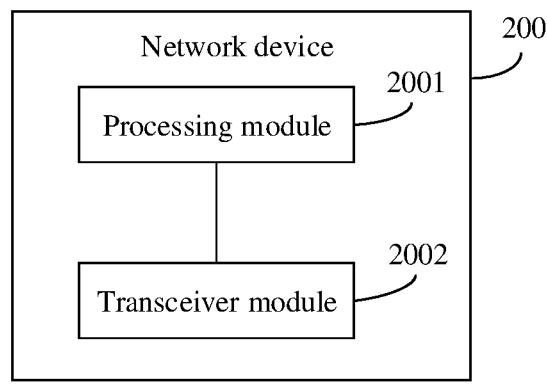
FIG. 20 is still another schematic structural diagram of a network device according to an embodiment of this application.

Alternatively, for example, the communications apparatus is the network device in the foregoing method embodiments. FIG. 20 is a schematic structural diagram of a network device 200. The network device 200 includes a processing module 2001 and a transceiver module 2002. The transceiver module 2002 may also be referred to as a transceiver unit, and is configured to implement a sending and/or receiving function, for example, may be a transceiver circuit, a transceiver, a transceiver, or a communications interface.

The processing module 2001 is configured to send, to a terminal device via the transceiver module 2002, information about a PRACH resource set and information about one or more PUSCH resources associated with each PRACH resource in the PRACH resource set. Each PUSCH resource associated with each PRACH resource is associated with one preamble sequence set. The processing module 2001 is further configured to: if a first PUSCH resource associated with a valid first PRACH resource in the PRACH resource set is valid, receive a first preamble sequence from the terminal device on the first PRACH resource via the transceiver module 2002, and receive uplink data from the terminal device on the first PUSCH resource via the transceiver module 2002. The first preamble sequence is a preamble sequence in a preamble sequence set associated with the first PUSCH resource.

Optionally, the processing module 2001 is further configured to determine whether a first interval between a start time unit in the first PUSCH resource and a first downlink time unit before the start time unit is greater than a first threshold. The first PUSCH resource is a PUSCH resource that is in one or more PUSCH resources associated with the first PRACH resource and that does not include a downlink time unit. The processing module 2001 is further configured to: if the first interval is greater than the first threshold, determine that the first PUSCH resource is valid.

Optionally, the processing module 2001 is further configured to determine whether a second interval between an end time unit in the first PUSCH resource and a second downlink time unit after the end time unit is greater than a second threshold. The first PUSCH resource is a PUSCH resource that is in one or more PUSCH resources associated with the first PRACH resource and that does not include a downlink time unit. The processing module 2001 is further configured to: if the second interval is greater than the second threshold, determine that the first PUSCH resource is valid.

Optionally, the processing module 2001 is further configured to determine whether a ratio of a quantity of available uplink time units in the first PUSCH resource to a quantity of time units occupied by the first PUSCH resource is greater than a third threshold. The processing module 2001 is further configured to: if the ratio is greater than the third threshold, determine that the first PUSCH resource is valid.

Optionally, the processing module 2001 is further configured to send first indication information to the terminal device via the transceiver module 2002. The first indication information indicates the third threshold.

Optionally, the processing module 2001 is further configured to: if the PUSCH resources associated with the first PRACH resource are all invalid, receive a second preamble sequence from the terminal device on the first PRACH resource via the transceiver module 2002.

Optionally, the processing module 2001 is further configured to send second indication information to the terminal device via the transceiver module 2002. The second indication information is used to indicate that when there is a valid PRACH resource, and PUSCH resources associated with the valid PRACH resource are all invalid, the terminal device sends a preamble sequence on the valid PRACH resource.

Optionally, the processing module 2001 is further configured to send third indication information to the terminal device via the transceiver module 2002. The third indication information is used to indicate that when there is a valid PRACH resource, and PUSCH resources associated with the valid PRACH resource are all invalid, the terminal device skips sending a preamble sequence on the valid PRACH resource.

Optionally, that the processing module 2001 is configured to send, to a terminal device via the transceiver module 2002, information about a PRACH resource set and information about one or more PUSCH resources associated with each PRACH resource in the PRACH resource set includes: The processing module 2001 is configured to send a RACH configuration message to the terminal device via the transceiver module 2002. The RACH configuration message includes the information about the PRACH resource set and the information about the one or more PUSCH resources associated with each PRACH resource in the PRACH resource set. Each PUSCH resource associated with each PRACH resource is associated with one preamble sequence set. In this embodiment of this application, that the processing module 2001 is configured to send the foregoing information or message via the transceiver module 2002 may be understood as follows: After obtaining the foregoing information or message, the processing module 2001 is configured to generate a signal carrying the foregoing information or message. The signal may be sent by the transceiver module 2002 with or without signal processing. Alternatively, in this embodiment of this application, that the processing module 2001 is configured to receive the foregoing information or message via the transceiver module 2002 may be understood as follows: After receiving a signal that is sent from the outside and that carries the foregoing information or message, the transceiver module 2002 sends, with or without signal processing, the signal to the processing module 2001 for processing. A general description is provided herein, and details are not described below. All related content of the steps in the foregoing method embodiments may be cited in function descriptions of corresponding functional modules.

In this embodiment, the network device 200 is presented in a form of functional modules obtained through division in an integrated manner. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the network device 200 may be in a form of the network device 30 shown in FIG. 5.

For example, the processor 301 in the network device 30 shown in FIG. 5 may invoke one or more computer-executable instructions stored in the memory 302, so that the network device 30 performs the random access method in the foregoing method embodiments.

Specifically, the processor 301 in the network device 30 shown in FIG. 5 may invoke the one or more computer-executable instructions stored in the memory 302, to implement functions/implementation processes of the processing module 2001 and the transceiver module 2002 in FIG. 20. Alternatively, the processor 301 in the network device 30 shown in FIG. 5 may invoke the one or more computer-executable instructions stored in the memory 302, to implement functions/implementation processes of the processing module 2001 in FIG. 20, and the transceiver 303 in the network device 30 shown in FIG. 5 may implement functions/implementation processes of the transceiver module 2002 in FIG. 20.

The network device 200 provided in this embodiment can perform the foregoing random access method. Therefore, for a technical effect that can be achieved by the network device 200, refer to the foregoing method embodiments.

Optionally, an embodiment of this application further provides a communications apparatus (for example, the communications apparatus may be a chip or a chip system). The communications apparatus includes a processor, configured to implement the method in any one of the foregoing method embodiments. In a possible implementation, the communications apparatus further includes a memory. The memory is configured to store a necessary program instruction and necessary data. The processor may invoke program code stored in the memory, to indicate the communications apparatus to perform the method in any one of the foregoing method embodiments. Certainly, the communications apparatus may not include the memory. When the communications apparatus is a chip system, the communications apparatus may include a chip, or may include a chip and another discrete component. This is not specifically limited in embodiments of this application.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium, or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, wireless, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like. In the embodiments of this application, the computer may include the apparatuses described above.

Although this application is described with reference to the embodiments, in a procedure of implementing this application that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a case of a plurality. A single processor or another unit may implement several functions enumerated in the claims. Some measures are recorded in dependent claims that are different from each other, but this does not mean that these measures cannot be combined to produce a great effect.

Although this application is described with reference to specific features and the embodiments thereof, it is obvious that various modifications and combinations may be made to them without departing from the scope of this application. Correspondingly, the specification and accompanying drawings are merely example descriptions of this application defined by the appended claims, and are intended to cover any of or all modifications, variations, combinations, or equivalents within the scope of this application. It is clear that a person skilled in the art can make various modifications and variations to this application without departing from the scope of this application. This application is intended to cover these modifications and variations of this application provided that they fall within the scope of protection defined by the claims.

The invention claimed is:

1. A random access method, comprising:
receiving, by a terminal device from a network device, information about a physical random access channel (PRACH) resource set and information about one or more physical uplink shared channel (PUSCH) resources associated with each PRACH resource in the PRACH resource set, wherein each PUSCH resource associated with each PRACH resource is associated with one preamble sequence set; and
upon determination that a first PUSCH resource associated with a valid first PRACH resource in the PRACH resource set is valid, sending, by the terminal device, a first preamble sequence to the network device on the first PRACH resource, and sending, by the terminal device, uplink data to the network device on the first PUSCH resource, wherein the first preamble sequence is in a preamble sequence set associated with the first PUSCH resource,
wherein validity of the first PUSCH resource associated with the valid first PRACH resource is determined by the terminal device based on at least one time unit occupied by the first PUSCH resource.

2. The method according to claim 1, further comprising:
determining, by the terminal device, whether a first interval between a start time unit in the first PUSCH resource and a first downlink time unit before the start time unit is greater than a first threshold, wherein the first PUSCH resource is in the one or more PUSCH resources associated with the first PRACH resource and that does not comprise a downlink time unit; and upon determination that the first interval is greater than the first threshold, determining, by the terminal device, that the first PUSCH resource is valid.

3. The method according to claim 1, further comprising:
determining, by the terminal device, whether a ratio of a quantity of available uplink time units in the first PUSCH resource to a quantity of time units occupied by the first PUSCH resource is greater than a third threshold; and
upon determination that the ratio is greater than the third threshold, determining, by the terminal device, that the first PUSCH resource is valid.

4. The method according to claim 3, further comprising:
receiving, by the terminal device, first indication information from the network device, wherein the first indication information indicates the third threshold.

5. The method according to claim 1, wherein the first PUSCH resource is a resource segment of a second PUSCH resource associated with the first PRACH resource, and the resource segment is used for repeated transmission of a PUSCH.

6. The method according to claim 1, further comprising:
upon determination that the one or more PUSCH resources associated with the first PRACH resource are all invalid, sending, by the terminal device, a second preamble sequence to the network device on the first PRACH resource.

7. A communications apparatus, comprising at least one processor and a transceiver;
wherein the at least one processor is configured to:
receive, via the transceiver from a network device, information about a physical random access channel (PRACH) resource set and information about one or more physical uplink shared channel (PUSCH) resources associated with each PRACH resource in the PRACH resource set, wherein each PUSCH resource associated with each PRACH resource is associated with one preamble sequence set; and
upon determination that a first PUSCH resource associated with a valid first PRACH resource in the PRACH resource set is valid, send a first preamble sequence to the network device on the first PUSCH resource via the transceiver, and send uplink data to the network device on the first PUSCH resource via the transceiver, wherein the first preamble sequence is in a preamble sequence set associated with the first PUSCH resource,
wherein validity of the first PUSCH resource associated with the valid first PRACH resource is determined by the communications apparatus based on at least one time unit occupied by the first PUSCH resource.

8. The communications apparatus according to claim 7, wherein the at least one processor is further configured to:
determine whether a first interval between a start time unit in the first PUSCH resource and a first downlink time unit before the start time unit is greater than a first threshold, wherein the first PUSCH resource is in the one or more PUSCH resources associated with the first PRACH resource and that does not comprise a downlink time unit; and
upon determination that the first interval is greater than the first threshold, determine that the first PUSCH resource is valid.

9. The communications apparatus according to claim 7, wherein the at least one processor is further configured to:
determine whether a ratio of a quantity of available uplink time units in the first PUSCH resource to a quantity of time units occupied by the first PUSCH resource is greater than a third threshold; and
upon determination that the ratio is greater than the third threshold, determine that the first PUSCH resource is valid.

10. The communications apparatus according to claim 9, wherein the at least one processor is further configured to receive first indication information from the network device via the transceiver, and wherein the first indication information indicates the third threshold.

11. The communications apparatus according to claim 7, wherein the first PUSCH resource is a resource segment of a second PUSCH resource associated with the first PRACH resource, and the resource segment is used for repeated transmission of a PUSCH.

12. The communications apparatus according to claim 7, wherein the at least one processor is further configured to:
upon determination that the one or mere PUSCH resources associated with the first PRACH resource are all invalid, send a second preamble sequence to the network device on the first PRACH resource via the transceiver.

13. A communications apparatus, comprising at least one processor and a transceiver;
the at least one processor is configured to:
send, to a terminal device via the transceiver, information about a physical random access channel (PRACH) resource set and information about one or more physical uplink shared channel (PUSCH) resources associated with each PRACH resource in the PRACH resource set, wherein each PUSCH resource associated with each PRACH resource is associated with one preamble sequence set; and
upon determination that a first PUSCH resource associated with a valid first PRACH resource in the PRACH resource set is valid, receive a first preamble sequence from the terminal device on the first PRACH resource via the transceiver, and receive uplink data from the terminal device on the first PUSCH resource via the transceiver, wherein the first preamble sequence is in a preamble sequence set associated with the first PUSCH resource,
wherein the validity of the first PUSCH resource associated with the valid first PRACH resource is determined by the terminal device based on at least one time unit occupied by the first PUSCH resource.

14. The communications apparatus according to claim 13, wherein the at least one processor is further configured to determine whether a first interval between a start time unit in the first PUSCH resource and a first downlink time unit before the start time unit is greater than a first threshold, wherein the first PUSCH resource is in the one or more PUSCH resources associated with the first PRACH resource and that does not comprise a downlink time unit; and
upon determination that the first interval is greater than the first threshold, determine that the first PUSCH resource is valid.

15. The communications apparatus according to claim 13, wherein the at least one processor is further configured to:
determine whether a ratio of a quantity of available uplink time units in the first PUSCH resource to a quantity of time units occupied by the first PUSCH resource is greater than a third threshold; and
upon determination that the ratio is greater than the third threshold, determine that the first PUSCH resource is valid.

16. The communications apparatus according to claim 15, wherein the at least one processor is further configured to send first indication information to the terminal device via the transceiver, wherein the first indication information indicates the third threshold.

17. The communications apparatus according to claim 13, wherein the first PUSCH resource is a resource segment comprised in a second PUSCH resource associated with the first PRACH resource, and the resource segment is used for repeated transmission of a PUSCH.

18. The communications apparatus according to claim 13, wherein the at least one processor is further configured to:
  upon determination that the one or more PUSCH resources associated with the first PRACH resource are all invalid, receive a second preamble sequence from the terminal device on the first PRACH resource via the transceiver.

19. A non-transitory computer-readable storage medium, comprising instructions, that when run on a communications apparatus, cause the communications apparatus to perform operations comprising:

receiving, from a network device, information about a physical random access channel (PRACH) resource set and information about one or more physical uplink shared channel (PUSCH) resources associated with each PRACH resource in the PRACH resource set, wherein each PUSCH resource associated with each PRACH resource is associated with one preamble sequence set; and upon determination that a first PUSCH resource associated with a valid first PRACH resource in the PRACH resource set is valid, sending a first preamble sequence to the network device on the first PRACH resource, and sending uplink data to the network device on the first PUSCH resource, wherein the first preamble sequence is in a preamble sequence set associated with the first PUSCH resource, wherein validity of the first PUSCH resource associated with the valid first PRACH resource is determined by the communication apparatus based on at least one time unit occupied by the first PUSCH resource.

* * * * *

UNITED STATES PATENT AND TRADEMARK OFFICE
CERTIFICATE OF CORRECTION

| | | |
|---|---|---|
| PATENT NO. | : 12,004,232 B2 | Page 1 of 1 |
| APPLICATION NO. | : 17/401514 | |
| DATED | : June 4, 2024 | |
| INVENTOR(S) | : Yiqun Wu et al. | |

It is certified that error appears in the above-identified patent and that said Letters Patent is hereby corrected as shown below:

In the Specification

Column 1, Line 26, change, "1B" to --1b--;

Column 1, Line 27, change "1B" to --1b--;

Column 5, Line 62, change "1B" to --1b--;

Column 7, Line 6, change "I" to --/--;

Column 10, Line 45, change "Si" to --S1--;

In the Claims

Column 35, Claim 7, Line 45, change "PUSCH" to --PRACH--;

Column 36, Claim 12, Line 19, change "mere" to --more--; and

Column 38, Claim 19, Line 19, change "communication" to --communications--.

Signed and Sealed this
Second Day of July, 2024

Katherine Kelly Vidal
*Director of the United States Patent and Trademark Office*